(12) United States Patent
Kim et al.

(10) Patent No.: US 7,366,272 B2
(45) Date of Patent: Apr. 29, 2008

(54) METHOD AND DEVICE FOR TRANSMITTING PACKET DATA IN MOBILE COMMUNICATION SYSTEM

(75) Inventors: Min-Goo Kim, Suwon-shi (KR); Sang-Hyuck Ha, Suwon-shi (KR)

(73) Assignee: Samsung Electronics Co., Ltd (KR)

( * ) Notice: Subject to any disclaimer, the term of this patent is extended or adjusted under 35 U.S.C. 154(b) by 1216 days.

(21) Appl. No.: 09/986,210

(22) Filed: Oct. 22, 2001

(65) Prior Publication Data
US 2002/0080902 A1 Jun. 27, 2002

(30) Foreign Application Priority Data
Oct. 21, 2000 (KR) .................. 10-2000-0062153

(51) Int. Cl.
H04L 23/00 (2006.01)
H04L 27/00 (2006.01)
H03M 13/03 (2006.01)

(52) U.S. Cl. .................. 375/377; 375/295; 714/790

(58) Field of Classification Search .............. 370/428, 370/240, 260, 352, 335, 347, 394, 399, 422, 370/216, 232, 252, 465, 468, 320, 342; 341/139, 341/144; 340/146; 375/259, 265, 262, 341, 375/340, 377, 220, 295; 714/755, 786, 701, 714/790
See application file for complete search history.

(56) References Cited

U.S. PATENT DOCUMENTS

| | | | | |
|---|---|---|---|---|
| 5,121,395 A | | 6/1992 | Millar | |
| 5,691,992 A | | 11/1997 | Molnar et al. | |
| 6,052,821 A | * | 4/2000 | Chouly et al. | 714/790 |
| 6,158,041 A | * | 12/2000 | Raleigh et al. | 714/792 |
| 6,332,005 B1 | * | 12/2001 | Pehkonen | 375/259 |
| 6,604,216 B1 | * | 8/2003 | Javerbring et al. | 714/751 |
| 6,665,829 B2 | * | 12/2003 | Eroz et al. | 714/755 |
| 6,690,734 B1 | * | 2/2004 | Lundby et al. | 375/259 |
| 6,744,744 B1 | * | 6/2004 | Tong et al. | 370/320 |
| 6,876,641 B2 | * | 4/2005 | Banister | 370/335 |
| 7,145,917 B1 | * | 12/2006 | Qian | 370/465 |
| 2003/0221156 A1 | * | 11/2003 | Berger et al. | 714/755 |

* cited by examiner

*Primary Examiner*—Mohammed Ghayour
*Assistant Examiner*—Sophia Vlahos
(74) *Attorney, Agent, or Firm*—The Farrell Law Firm, PC

(57) ABSTRACT

There is provided a device and method for transmitting packet data in a mobile communication system. A sub-code generator generates a plurality of sub-codes with the same or different code rates for the input of a PLP (Physical Layer Packet) information bit stream. A controller determines a minimum data rate by which the number of the modulation symbols of a sub-code generated by a predetermined modulation method is equal to or greater than the number of transmittable modulation symbols for each time period. A symbol pruner prunes part of the modulation symbols of the sub-code to make the number of the modulation symbols of the sub-code equal to the number of transmittable modulation symbols for the time period, if the number of the modulation symbols of the sub-code is greater than the number of transmittable modulation symbols for the time period.

19 Claims, 23 Drawing Sheets

METHOD AND DEVICE FOR TRANSMITTING PACKET DATA IN MOBILE COMMUNICATION SYSTEM

PRIORITY

This application claims priority to an application entitled "Method and Device for Transmitting Packet Data in Mobile Communication System" filed in the Korean Industrial Property Office on Oct. 21, 2000 and assigned Ser. No. 2000-62153, the contents of which are hereby incorporated by reference.

BACKGROUND OF THE INVENTION

1. Field of the Invention

The present invention relates generally to data transmission in a mobile communication system, and in particular, to a packet data transmitting device and method.

2. Description of the Related Art

For forward packet data transmission in a mobile communication system, a mobile station is assigned a forward dedicated channel (DCH) from a base station. Mobile communication systems as mentioned below include satellite systems, ISDN, digital cellular systems, W-CDMA, UMTS, and IMT-2000. Upon receipt of the forward packet data, the mobile station determines whether the reception is successful and if it is, the mobile station transmits the packet data to its higher layer. On the other hand, if errors are detected from the packet data, the mobile station requests its retransmission by the HARQ (Hybrid Automatic Repeat Request) Scheme. HARQ is a retransmission scheme using both FEC (Forward Error Correction) and ARQ (Automatic Repeat Request) for requesting retransmission of a data packet having an error. HARQ increases transmission throughput and improves system performance by channel coding for error correction. The main channel coding methods are convolutional coding and turbo coding.

A HARQ system uses soft combining to increase throughput. There are two types of soft combining: packet diversity combining and packet code combining. These are also referred to as soft packet combining. Despite having lower performance characteristics relative to packet code combining, packet diversity combining is widely used when performance loss is low, due to its simple implementation.

A packet transmission system uses packet code combining to improve transmission throughput. A transmitter transmits a code with a different data rate at each packet transmission. If an error is detected in the received packet, a receiver requests a retransmission and performs soft combining between the packet and a retransmitted packet. The retransmitted packet may have a different code from that of the previous packet. The Packet code combining is a process of combining received N packets with a code rate R to a code with an effective code rate of R/N prior to decoding, to thereby obtain a coding gain.

With regard to packet diversity combining, the transmitter transmits a code with the same code rate R at each packet transmission. If an error is detected in the received packet, the receiver requests a retransmission and performs soft combining between the packet and the retransmitted packet. The retransmitted packet has an identical code to that in the previous packet. In this sense, packet diversity combining can be considered symbol averaging on a random channel. The packet diversity combining scheme reduces noise power by averaging the soft outputs of input symbols and achieves a diversity gain as offered by a multipath channel because the same code is repeatedly transmitted on a fading channel. However, packet diversity combining does not provide such an additional coding gain as obtained according to a code structure in the packet code combining scheme.

Due to implementation simplicity, most packet communication systems have used the packet diversity combining scheme, which is under study for application to the synchronous IS-2000 system, especially for packet data transmission, and the asynchronous UMTS (Universal Mobile Telecommunication System) system. The reason is that existing packet communication systems have used convolutional codes, and even packet code combining does not offer a great gain when convolutional codes with a low data rate are used. If a system with R=1/3 supports retransmission, there is not a wide difference in performance between packet code combining and packet diversity combining. Thus, packet diversity combining is selected considering implementation simplicity. However, the use of turbo codes as FEC codes requires a different packet combining mechanism because the turbo codes are designed as error correction codes to perform very close to the "Shannon Channel Capacity Limit", and their performance varies obviously with the coding rates unlike convolutional codes. Therefore, it can be concluded that packet code combining is feasible for a packet communication system using turbo codes in a retransmission scheme to achieve the goal of optimum performance.

SUMMARY OF THE INVENTION

It is, therefore, an object of the present invention to provide a packet data transmitting device and method in a mobile communication system.

It is another object of the present invention to provide a device and method for generating sub-codes using turbo codes and transmitting the sub-codes in a mobile communication system while transmitting packet data.

It is a further object of the present invention to provide a device and method for transmitting packet data, making the number of modulation symbols corresponding to sub-codes generated using turbo codes equal to the number of transmittable modulation symbols in a mobile communication system.

The foregoing and other objects can be achieved by providing a packet data transmitting device and method in a mobile communication system.

According to one aspect of the present invention, a sub-code generator generates a plurality of sub-codes with the same or different code rates for the input of a PLP (Physical Layer Packet) information bit stream. A controller determines a minimum data rate by which the number of the modulation symbols of a sub-code generated by a predetermined modulation method is equal to or greater than the number of transmittable modulation symbols for each time period. A symbol pruner prunes part of the modulation symbols of the sub-code to make the number of the modulation symbols of the sub-code equal to the number of transmittable modulation symbols for the time period, if the number of the modulation symbols of the sub-code is greater than the number of transmittable modulation symbols for the time period.

It is preferred that the symbol pruner prunes part of second half of the modulation symbols of the sub-code.

It is preferred that the symbol pruner prunes part of the symbols of the first sub-code to make the sum of the numbers of preamble symbols and the number of the modulation symbols of the first sub-code equal to the number of the transmittable modulation symbols in the first time period, if the sum of the numbers of preamble symbols and the number of the modulation symbols of the first sub-code is greater than the number of transmittable modulation symbols.

According to another aspect of the present invention, a sub-code generator generates a plurality of sub-codes with the same or different code rates for the input of a PLP information bit stream and sequentially transmits the sub-codes for time periods. A controller determines a minimum data rate by which the number of the modulation symbols of a sub-code generated by a predetermined modulation method is equal to or greater than the number of transmittable modulation symbols for a time period. A channel interleaver channel-interleaves the symbols of the sub-code generated at the minimum code rate. A modulator modulates the channel-interleaved symbols by the predetermined modulation method. A symbol pruner prunes part of the modulation symbols of the sub-code to make the number of the modulation symbols of the sub-code equal to the number of transmittable modulation symbols for the time period, if the number of the modulation symbols of the sub-code is greater than the number of transmittable modulation symbols for the time period.

It is preferred that the symbol pruner prunes part of second half of the modulation symbols of the sub-code.

It is preferred that the symbol pruner prunes part of the symbols of the first sub-code to make the sum of the numbers of preamble symbols and the modulation symbols of the first sub-code equal to the number of the transmittable modulation symbols in the first time period, if the sum of the numbers of preamble symbols and the number of the modulation symbols of the first sub-code is greater than the number of transmittable modulation symbols.

According to a further aspect of the present invention, a sub-code generator generates a plurality of sub-codes with the same or different code rates for the input of a PLP information bit stream and sequentially transmits the sub-codes for time periods. A controller determines a minimum data rate by which the number of the modulation symbols of a sub-code generated by a predetermined modulation method is equal to or greater than the number of transmittable modulation symbols for a time period. A channel interleaver channel-interleaves the symbols of the sub-code generated at the minimum code rate. A symbol pruner prunes part of the channel-interleaved symbols to make the number of the channel-interleaved symbols equal to the number of transmittable modulation symbols, if the number of the channel-interleaved symbols is greater than the number of transmittable modulation symbols. A modulator modulates the remaining channel-interleaved symbols by the predetermined modulation method.

It is preferred that the symbol pruner prunes part of second half of the channel-interleaved symbols.

It is preferred that the symbol pruner prunes part of the channel-interleaved symbols of the first of the sub-codes generated at the minimum code rate to make the sum of the numbers of preamble symbols and the channel-interleaved symbols of the first sub-code equal to the number of the transmittable modulation symbols in the first time period, if the sum of the numbers of preamble symbols and the number of the channel-interleaved symbols of the first sub-code is greater than the number of transmittable modulation symbols.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

It will be made clear herein below that packet code combining is required for turbo codes when they are used for transmission or retransmission of packet data in a mobile communication system (e.g., IS-2000 and UMTS). Descriptions will be made on generation of sub-codes from turbo codes and transmission of packets using the sub-codes according to the present invention. Specifically, when the number of modulation symbols corresponding to sub-codes is greater than that of transmittable modulation symbols, as many symbols as the difference are pruned for transmission of packet data. The sub-codes are codes with a code rate less than the mother code rate of the turbo codes, to be packet-code-combined. In other words, when an original packet is segmented into smaller packets for retransmission to increase throughput, a sub-code is used for transmission of each segmented packet. These sub-codes have a code rate identical to or different from that of their previous sub-codes, which will be clarified in the following description.

A, Necessity of Packet Code Combining

1. Packet Code Combining and Packet Diversity Combining

As mentioned in the description of the prior art, there is not a wide performance difference between the packet diversity combining scheme and the packet code combining scheme for convolutional codes with a low data rate. However, there is an obvious performance difference between these schemes for turbo codes, unlike convolutional codes. Packet code combining offers a greater performance gain for turbo codes than packet diversity combining. In view of the above-described nature of the turbo codes, HARQ Type II/III schemes using turbo codes can improve throughput markedly.

Figure 1:
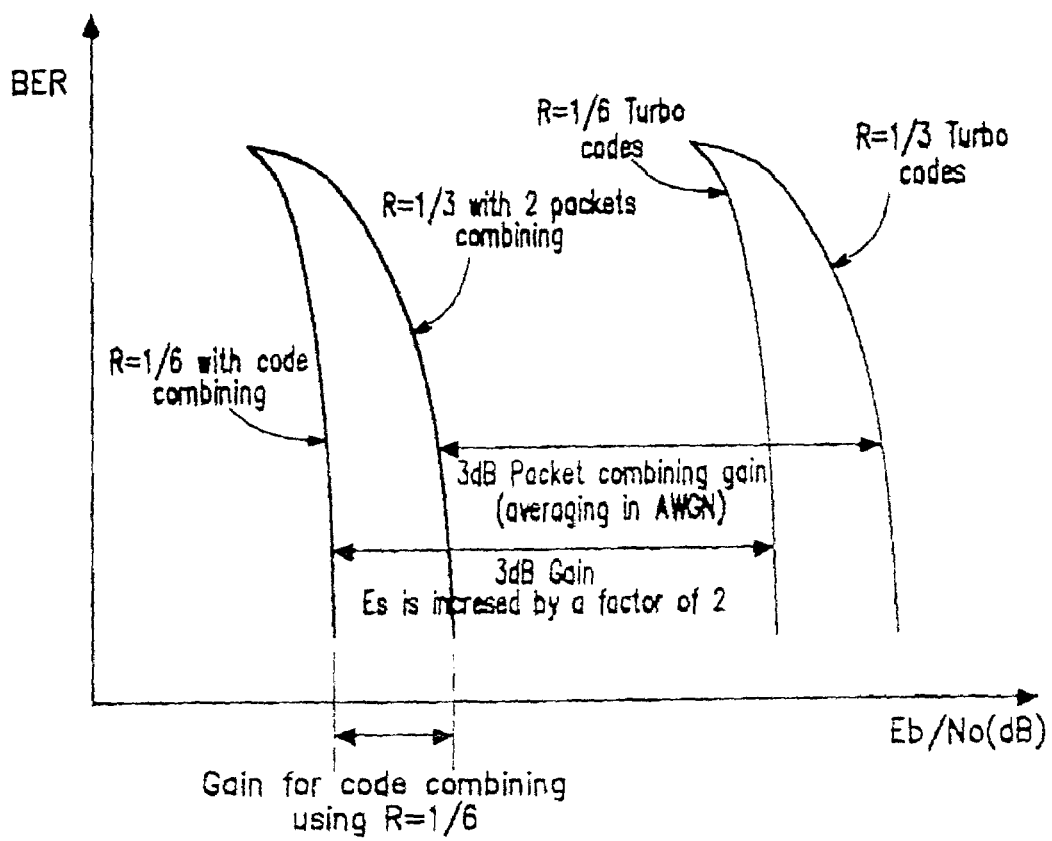
FIG. 1 is a graph showing the performance difference between packet code combining and packet diversity combining in a packet data system using turbo codes.

FIG. 1 is a graph showing the performance difference between packet code combining and packet diversity combining for turbo codes. As shown in FIG. 1, a turbo code with a low data rate of 1/6 exhibits a greater performance gain than a turbo code with a high code rate of 1/3 with the same symbol energy Es and obtains a performance gain of 3 dB from packet code combining. Consequently, generation of R=1/3 turbo codes by packet code combining of R=1/6 sub-codes produces a gain that turbo codes with a data rate lower than 1/3 exhibits and a gain that code combining of different codes offers, contemporaneously.

More specifically, for the same code symbol energy Es and the same given code rate, turbo codes provide performance close to the "Shannon Channel Capacity Limit" according to the code rates only if iteration decoding is fully implemented, unlike convolutional codes. It is known that a turbo code with a low code rate offers a greater performance gain than a turbo code with a high code rate with the same code symbol energy Es. For example, when R=1/3 is reduced to R=1/6, the performance difference can be estimated by analyzing a change in the "Shannon Channel Capacity Limit". The reason for assuming the same symbol energy irrespective of R=1/3 or 1/6 for the curves of FIG. 1 is that the same symbol energy Es is used for each retransmission in an HARQ system, as compared to a conventional analysis of the performance of turbo codes by checking the decrease of symbol energy caused by reduced code rates.

If an R=1/3 code [R=1/3?] is repeated once and the two codes are packet-diversity-combined on an AWGN (Additive White Gaussian Noise) channel, a maximum gain of 3 dB is obtained in terms of a symbol energy-to-noise ratio (Es/No). The same is the case with an R=1/6 code. Thus, a performance curve for the R=1/3 turbo code shifts to the left in parallel by a +3 dB scale due to a packet diversity combining gain, and a performance curve for the R=1/6 turbo code also shifts to the left in parallel by a +3 dB scale when the same symbol energy is given. Here, the performance curves are derived with respect to the energy-to-noise ratio (Eb/No) which is measured to compare code performances according to the code rates. As a consequence, the difference between the turbo code performance curves is equivalent to the performance difference between packet diversity combining and packet code combining. The performance difference according to the code rates can be estimated from the "Shannon Channel Capacity Limit" and a minimum performance difference can be obtained using a minimum required signal-to-noise ratio (SNR).

2. Minimum Required Eb/No for Code Rates

In a system using turbo codes with a code rate R and a very large encoder block size L, a minimum Eb/No required to provide an error-free channel is expressed as $$Eb/No > (4^R - 1)/2R \tag{1}$$

According to the above equation, the minimum required Eb/No in AWGN at each code rate for the turbo codes is listed in Table 1 below. In Table 1, a typical Eb/No indicates a required Eb/No for a bit error rate (BER) below 0.00001 when the encoding block size L of the turbo codes is 1024.

TABLE 1

| Code rates | Required Eb/No (dB) | Typical Eb/No (dB) for BER = $10^{-5}$ |
|---|---|---|
| 3/4 | 0.86 | 3.310 |
| 2/3 | 0.57 | 2.625 |
| 1/2 | 0.00 | 1.682 |
| 3/8 | −0.414 | 1.202 |
| 1/3 | −0.55 | 0.975 |
| 1/4 | −0.82 | 0.756 |
| 1/5 | −0.975 | 0.626 |
| 1/6 | −1.084 | 0.525 |
| 0 | −1.62 | NA |

As shown in Table 1, the required Eb/No are 0.86, 0.57, 0.0, −0.414, −0.55, −0.82, −0.975, and −1.084 dB respectively, for the code rates of 3/4, 2/3, 1/2, 3/8, 1/3, 1/4, 1/5, and 1/6. A performance difference of at least 0.53 db exists between a system using an R=1/3 code and a system using an R=1/6 code. This is a minimum performance difference based on the "Shannon Channel Capacity Limit". In addition, when considering implementation of a real decoder and system environment, the difference becomes wider. During a simulation, an approximately 1.12 dB performance difference was observed between a system using packet code combining for R=2/3 codes and a system using packet diversity combining for the R=2/3 codes.

Table 2 shows the performance difference between packet code combining and packet diversity combining after one retransmission in a system with a sub-code code rate of 2/3. As shown in Table 2, a minimum performance difference is 1.12 dB and the packet code combining scheme produces a higher performance gain in the system using turbo codes.

TABLE 2

Figure 2:
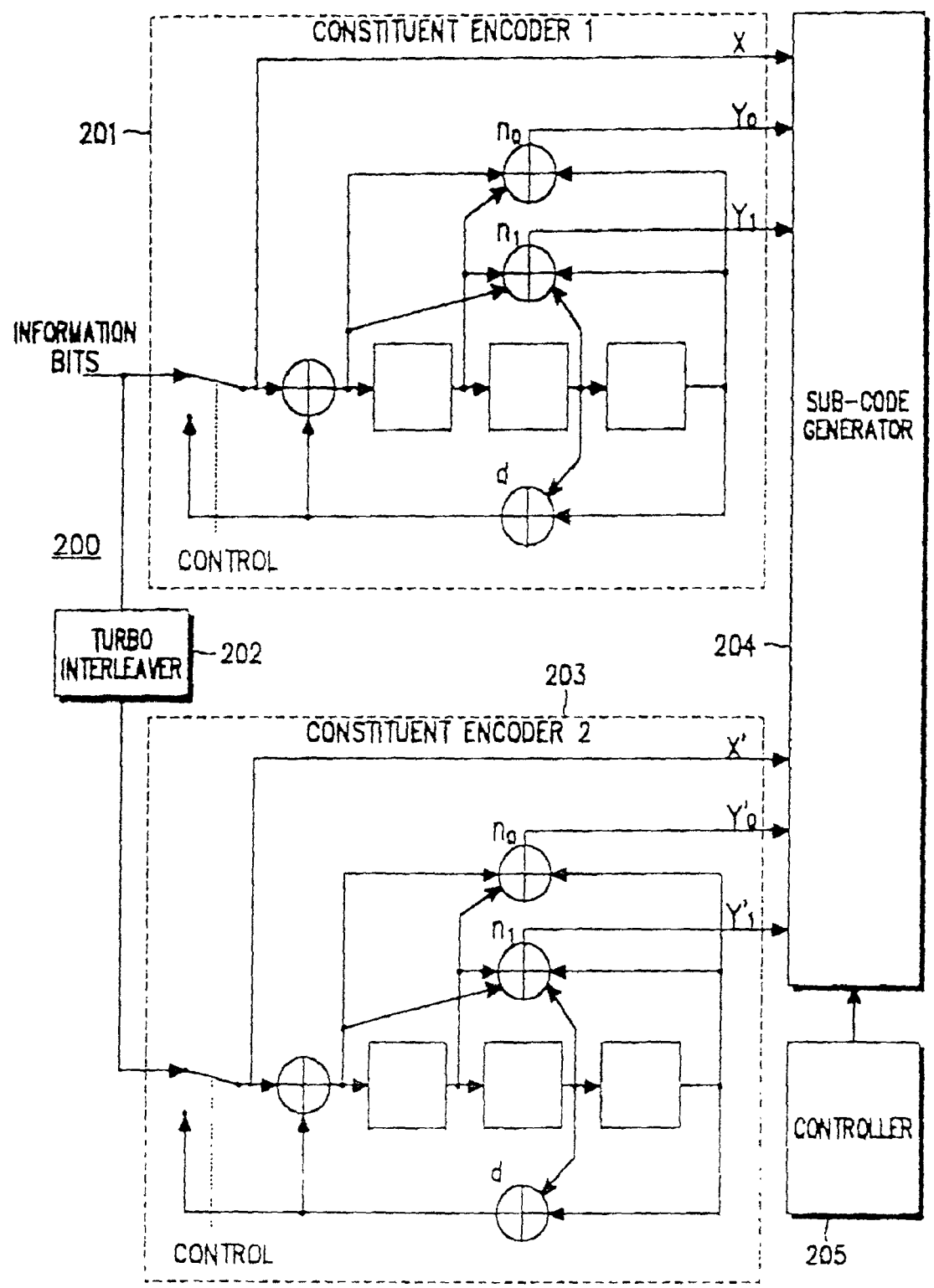
FIG. 2 is a block diagram of a sub-code generating apparatus according to an embodiment of the present invention.

| Items | Packet combining | Code combining |
|---|---|---|
| Mother code rate $R_m$ | 1/3 (X, Y0, Y'0) in FIG. 2 | 1/3 (X, Y0, Y'0) in FIG. 2 |
| Block size (L) | 496 | 496 |
| Maximum number of iterations | 8 | 8 |
| Number of transmissions | 2 | 2 |
| Actual Tx code rate Re for each transmission | 2/3 (by puncturing) | 2/3 (by puncturing) |
| Redundancy selection | Identical pattern for all transmissions. | Different pattern for all transmissions. |
| Soft combining | Packet diversity combining | Packet code combining |
| Gain through retransmissions | Symbol repetition gain | Coding gain for low rate codes |
| Minimum required Eb/No in Table 1 | +0.57 (dB) | R = 2/3 +0.57 (dB) <br> R = 2/6 −0.55 (dB) |
| Required Eb/No at 2nd retransmissions | +0.57 − 3.0 (dB) | −0.55 − 3.0 (dB) |
| Relative performance gain | 0 | 1.12 (= 0.57 + 0.55) dB |
| Simulated relative gain (@ BER = $10^{-5}$) | 0 | 2.5 (dB) |

As described above, the packet code combining scheme shows excellent performance in the turbo code-using retransmission system. Therefore, the present invention provides a sub-code generating method for optimal packet code combining in a retransmission system using turbo codes. Generation of sub-codes for packet code combining according to a predetermined rule produces the aforementioned code combining gain and maximizes the performance of a system requesting sub-codes of the same size for each retransmission.

The present invention proposes a method of generating sub-codes for optimal packet combining in a retransmission system using turbo codes and a system that selectively employs a packet code combining scheme and a packet diversity combining scheme according to the data rates. The advantages and performance gain of the proposed system and an HARQ protocol for operating the system will be described.

First, the operation of the system that selectively uses packet code combining scheme and packet diversity combining scheme according to the data rates will be described.

In a system using R=1/5 turbo codes, for example, packet code combining applies until the overall code rate of codes produced by soft-combining of retransmitted packets reaches 1/5. For the subsequent retransmitted packets, packet diversity combining and then packet code combining are performed. If the first packet is transmitted at a data rate of 1/3, the required redundancy symbols are provided at a retransmission request to make the overall code rate 1/5. Thus, when a receiver receives both packets, the overall code rate becomes 1/5. Each of the following packets is repeated prior to transmission and the receiver performs packet diversity combining and then packet code combining on the retransmitted packets at the data rate 1/5.

B. Generation of Sub-codes

1. Sub-code Generating Device

FIG. 2 is a block diagram of a sub-code generating apparatus using turbo codes according to an embodiment of the present invention. As shown in FIG. 2, the sub-code generating apparatus includes a turbo encoder, a sub-code generator 204, and a controller 205. The turbo encoder includes a first constituent encoder 201, a second constituent encoder 203, interleaver 202.

First, with regard to the turbo encoder, a first component encoder (or a first constituent encoder) 201 encodes an input information bit stream and outputs first code symbols, i.e., information symbols X and first parity symbols Y0 and Y1. An interleaver 202 interleaves the input information bit stream according to a predetermined rule. A second component encoder (or a second constituent encoder) 203 encodes the interleaved information bit stream and outputs second code symbols, i.e., information symbols X' and second parity symbols Y'0 and Y'1. Thus, the output symbols of the turbo encoder are the first and second code symbols. Since the information symbols X' generated from the second component encoder 203 are not transmitted in reality, the code rate of the turbo encoder is 1/5.

The sub-code generator 204 generates sub-codes from the first and second code symbols received from the first and second component encoders 201 and 203 by puncturing and repetition under the control of the controller 205. The controller 205 stores puncturing (and repetition) matrixes generated from algorithms shown in FIGS. 3, 4 and 5 and outputs symbol selection signals for the puncturing matrixes to the sub-code generator 204. Then, the sub-code generator 204 selects a predetermined number of code symbols within a predetermined puncturing range according to the symbol selection signals.

The reference characters as used here, X, Y0, Y1, Y'0, and Y'1 are defined as follows.

X: systematic code symbol or information symbol

Figure 3:
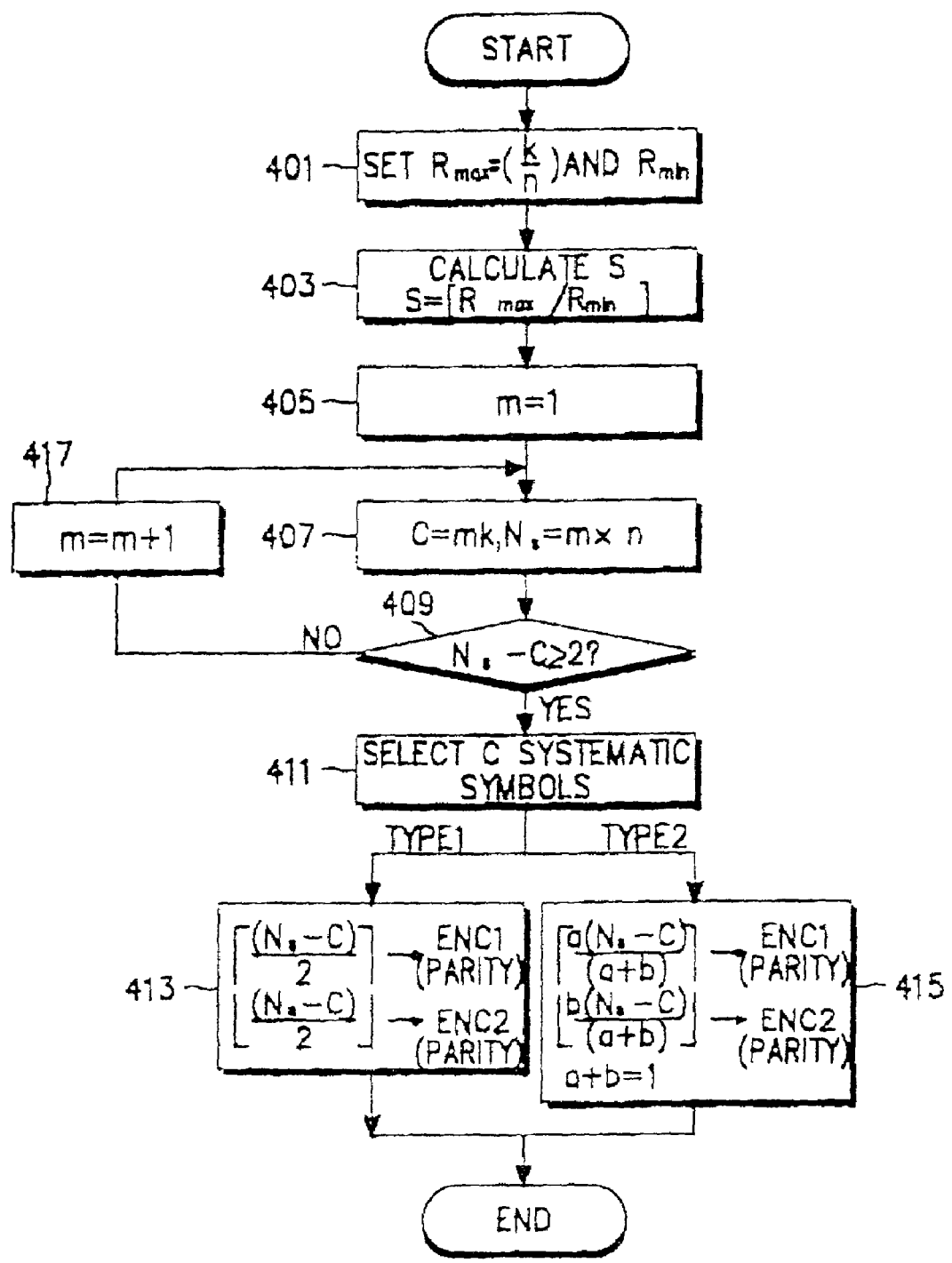
FIG. 3 is a flowchart illustrating a method of generating the first sub-code in the sub-code set of quasi-complementary turbo codes (QCTCs) according to the embodiment of the present invention.
Figure 4:
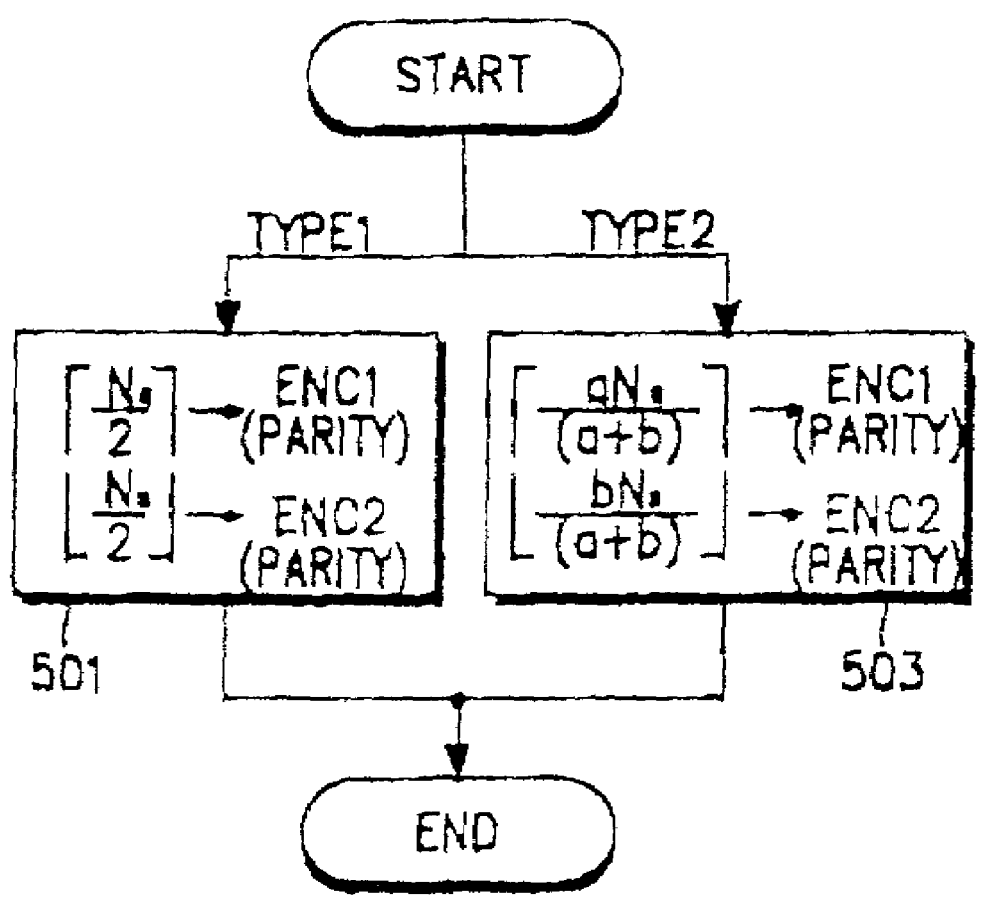
FIG. 4 is a flowchart illustrating a method of generating middle sub-codes in the sub-code set of the QCTCs according to the embodiment of the present invention.
Figure 5:
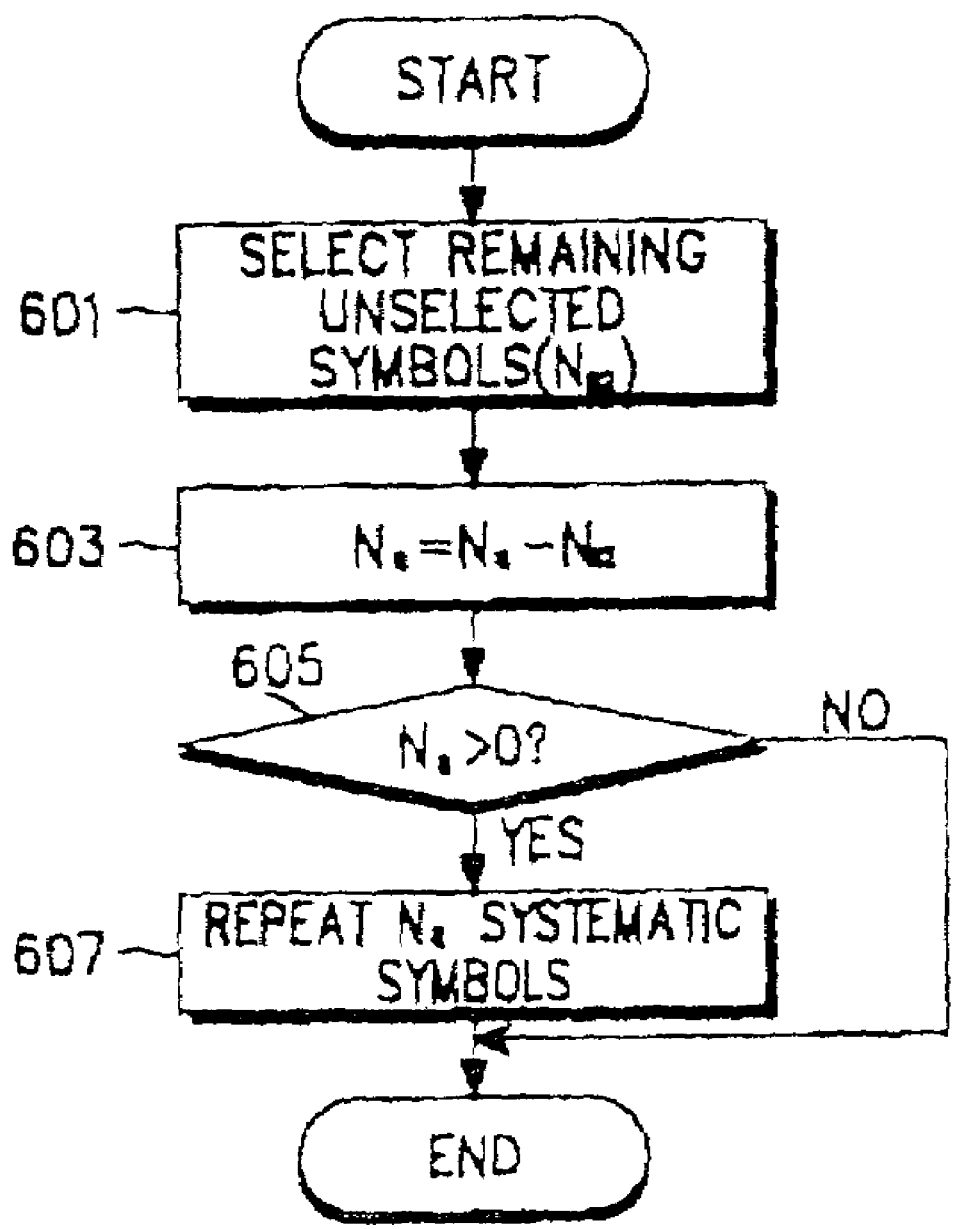
FIG. 5 is a flowchart illustrating a method of generating the last sub-code in the sub-code set of the QCTCs according to the embodiment of the present invention.

Y0: redundancy symbol (parity symbol) from the upper component encoder of the turbo encoder Y1: redundancy symbol (parity symbol) from the upper component encoder of the turbo encoder Y'0: redundancy symbol (parity symbol) from the lower component encoder of the turbo encoder Y'1: redundancy symbol (parity symbol) from the lower component encoder of the turbo encoder 2. Generation of Sub-codes FIGS. 3, 4 and 5 are flowcharts illustrating sub-code (or puncturing matrix) generating procedures according to the embodiment of the present invention. Specifically, FIG. 3 illustrates a procedure of generating the first sub-code $C_0$ in a sub-code set, FIG. 4 illustrates a procedure of generating middle sub-codes $C_1$ to $C_{s-2}$ in the sub-code set, and FIG. 5 illustrates a procedure of generating the last sub-code $C_{s-1}$ in the sub-code set.

Herein below, ENC1 (referred to as first code symbols) indicate the information symbols X and the first parity symbols Y0 and Y1 output from the first component encoder 201, and ENC2 (referred to as second code symbols) indicate the second parity symbols Y'0 and Y'1 output from the second component encoder 203.

Referring to FIG. 3, a maximum code rate (Rmax) available to a transmitter is set in step 401. This value is mostly given according to the data rate used in the system. A minimum code rate (Rmin) is set to be an integer-multiple of Rmax (k/n). Although Rmin can be determined arbitrarily, it is usually 1/6 or lower, or 1/7 or lower because a coding gain is saturated due to the decrease of code rates at or below R=1/7 in turbo codes. In addition, the real code rate, i.e., mother code rate (R) of a decoder in a receiver, is determined. R is set to be greater than Rmin.

In real system implementation, Rmax and Rmin are preset. In a sense, Rmax is the code rate of the sub-codes to be generated and Rmin is a target code rate after code combining of the sub-codes. In general, Rmin is the code rate of an encoder in the transmitter.

In step 403, the number of sub-codes (S) is calculated by the following equation using Rmax and Rmin. Here, the number of the sub-codes or the number of puncturing matrixes is a minimum integer exceeding the ratio of Rmax to Rmin.

$$S = \lceil R_{max}/R_{min} \rceil \qquad (2)$$

where $\lceil * \rceil$ represents a minimum integer equal to or larger than (Here * means $R_{max}/R_{min}$).

A variable m is set to an initial value of 1 in step 405 and C=(m×k) is determined in step 407. C is the number of the columns of each puncturing matrix, determined by Rmax. For example, for Rmax=3/4, C can be 3, 6, 9, . . . and is set to a minimum available value for the first sub-code to be transmitted. Here, C is set to 3 for Rmax=3/4.

In step 407, the number of symbols to be selected from the puncturing matrix Ns is calculated by multiplying the variable m by the code length i.e., the number of code symbols n from Rmax=k/n. Ns is the number of selected symbols or the number of selected positions in each puncturing matrix and calculated by C/Rmax.

In step 409, (Ns−C) is compared with the number of the component encoders of the turbo encoder in the transmitter. The present turbo encoder is generally provided with two component encoders. Thus, it is assumed that two component encoders are used. It is determined whether (Ns−C) is 2 or greater in step 409 because the turbo encoder has two component encoders connected in parallel with the interleaver interposed as shown in FIG. 2, unlike conventional encoders using other single codes. In other words, at least one parity symbol from each component encoder must be transmitted after the information symbols are all transmitted in order to preserve the characteristics inherent in the turbo encoder.

If (Ns−C) is less than 2, at least one symbol is selected from either the first parity symbol set or the second parity symbol set. From the perspective of turbo codes, either case may face problems. Sub-codes generated without second parity symbols are not turbo codes but convolutional codes with K=4 from an encoder having only the first component encoder and offers no interleaver gain that is available in the turbo encoder. On the other hand, transmission of only systematic symbols without parity symbols from the first component encoder results in sub-codes with a code rate of 1. This is equivalent to an uncoded system without any coding gain. Accordingly, (Ns−C) must be equal to or greater than 2 to provide turbo encoder performance.

If (Ns−C) is equal to or greater than 2 in step 409, C systematic information symbols are selected from the puncturing matrix and the other symbols are selected according to a predetermined type in step 411. For Type 1, the other symbols are selected from the first and second parity symbols by Eq. (3) in step 413. The number of selected first parity symbols is equal to or greater than that of selected second parity symbols. For example, if the number of the other symbols (Ns−C) is 3, first and second parity symbols are selected by Eq. (3) and then one more symbol is selected from the second parity symbols.

$$\begin{array}{l} \lceil (Ns-C)/2 \rceil ENC1(parity) \\ \lfloor (Ns-C)/2 \rfloor ENC2(parity) \end{array} \qquad (3)$$

where $\lfloor * \rfloor$ represents a minimum integer equal to or less than *. In this case, * refers to (Ns−C)/2.

For Type 2, the other symbols are selected from the first and second parity symbols by Eq. (4) in step 415. If a and b are given as symbol distribution rates for the first parity symbols and the second parity symbols, respectively, as many symbols as a minimum integer equal to or larger than the ratio of a(Ns−C) to (a+b) are selected from the first parity symbols and as many symbols as a minimum integer equal to or less than the ratio of b(Ns−C) to (a+b) are selected from the second parity symbols.

$$\begin{array}{l} \lceil a(Ns-C)/(a+b) \rceil ENC1(parity) \\ \lfloor b(Ns-C)/(a+b) \rfloor ENC2(parity) \end{array} \qquad (4)$$

where a+b=1 and a and b indicate the symbol distribution rates for ENC1 and ENC2, respectively.

If the condition given in step 409 is not satisfied, that is, (Ns−C) is less than 2, the variable m is incremented by 1 in step 417 and the procedure returns to step 407. The purpose of step 409 is to determine whether sub-codes capable of preserving the nature of turbo codes can be generated within the present puncturing range (the size of the puncturing matrix). If the nature of the turbo codes cannot be preserved, the puncturing range is enlarged in step 417.

As described above, the initial puncturing matrix is so constructed that all information symbols are selected and at least one symbol is selected from each of the first and second parity symbol sets in the turbo encoder.

A middle puncturing matrix generation method referring to FIG. 4 will be described below By repeating the procedure of FIG. 4, puncturing matrixes $C_1$ to $C_{s-2}$ are generated.

Referring to FIG. 4, step 501 or 503 is performed according to a predetermined type. For Type 1, Ns symbols are selected from the first and second parity symbol sets by Eq. (5) in step 501. Ns is the product of m and n given from Rmax (=k/n). The number of selected first parity symbols is equal to or greater than that of selected second parity symbols. Here, unselected symbols are selected from the previous puncturing matrixes.

$$\begin{array}{l} \lceil Ns/2 \rceil ENC1(parity) \\ \lfloor NS/2 \rfloor ENC2(parity) \end{array} \qquad (5)$$

For Type 2, Ns symbols are selected from the first and second parity symbol sets according to predetermined rates by Eq. (6) in step 503. If a and b are given as symbol distribution rates for the first parity symbols and the second parity symbols, respectively, as many symbols as a minimum integer equal to or greater than the ratio of a(Ns) to (a+b) are selected from the first parity symbols and as many symbols as a minimum integer equal to or less than the ratio of b(Ns) to (a+b) are selected from the second parity symbols. Here, unselected symbols are selected from the previous puncturing matrixes.

$\lceil a(Ns)/(a+b) \rceil$ENC1(parity)

$\lfloor b(Ns)/(a+b) \rfloor$ENC2(parity)  (6)

A last puncturing matrix $C_{s-1}$ generating method will be described below referring to FIG. 5.

Referring to FIG. 5, the remaining unselected symbols are all selected from the previous puncturing matrixes in step 601. The number of the selected symbols is defined as Ns2. In step 603, a new Ns is defined by (Ns−Ns2). Since symbols at all positions are selected from the puncturing matrixes in the process of the operations shown in FIGS. 3, 4 and 5, the new Ns is the number of symbols to be repeatedly selected. In step 605, it is determined whether the new Ns is greater than 0. If the new Ns is 0, the procedure ends. If it is greater than 0, as many symbols as the new Ns are selected from the information symbols in step 607. In other words, the selected symbols are retransmitted.

The above-described sub-code generation method according to the present invention will be made clear below with specific numerical citations.

For Rmax=3/4 and R=1/5, Rmin=1/6 and S=6/(4/3)=4.5→5. Thus, five puncturing matrixes are produced.

{$C_0, C_1, C_2, C_3, C_4$}:Rmax=3/4.

Since the code rate of sub-codes is 3/4 and the number of sub-codes is 5, the sub-codes have a code rate 3/20 ((1/S)× Rmax=(1/5)×(3/4)=3/20) after code combining. This implies that for 3 information bits, a receiver receives 20 code symbols. However, since 15 symbols are generated from S×n=5×4=20 and S×k=5×3=15, predetermined 5 symbols among the 15 symbols are repeatedly transmitted. The repeated symbols are preferably information symbols. In the above example, if an information symbol X is repeated once in each sub-code, a decoder receives turbo codes with R=1/5 in which information symbols occur twice for each of S sub-codes.

3. Quasi-Complementary Code Set

The resulting sub-codes from the procedures shown in FIGS. 3, 4 and 5 are kinds of complementary codes, although they are not in a strict sense of the term because repeated symbols exist and each sub-code exhibits a different characteristic. In view of the sub-codes being produced from turbo codes, they will be called quasi-complementary turbo codes (QCTCs). An HARQ system employs the following retransmission scheme using QCTCs.

The HARQ system is a major example using packet code combining. Packet code combining is available to the present HARQ systems, HARQ Type I, Type II, and Type III. In these systems, a retransmission technique can be implemented using QCTCs. If a transport unit (TU) is defined as an information bit block being a basic unit for packet transmission, one sub-code $C_i$ is selected for each TU transmission in the hybrid systems.

A retransmission unit and an initial transmission TU can be the same or different in size. For every transmission, the following QCTC set is used.

From a QCTC $C_q$ having a code set size S, a mother code C can be reconstructed, or a new code $C_q$ with a lower code rate than the mother code C can be generated by combining (or code-combining) sub-codes $C_i$ (i=0, 1, 2, ..., S−1). The mother code has a minimum code rate available in the encoder. Then, the QCTC is defined as Original code C with code rate R=Rm or code C with code rate R<Rm $$= \bigcup_{i=0}^{S-1} C_i \quad (7)$$

where S is the number of sub-codes with a code rate of Ri and Rm is the mother code rate.

The operation of a system transmitting TUs of the same size for an initial transmission and each retransmission using a QCTC will be described. Needless to say, the transmission scheme using different TUs is also supported in the present invention. Here, S is 4 and R is 1/5.

(Step 1) Transmission is performed on a TU basis and a sub-code $C_i$ of the QCTC is transmitted at the initial transmission and each retransmission.

(Step 2) When the overall code rate of codes produced by soft combining of the initially transmitted and retransmitted packets is greater than 1/5, each sub-code $C_i$ of the QCTC is transmitted in the order of $C_0, C_1, C_2, ..., C_{S-1}$ at each retransmission request. This is packet code combining.

(Step 3) When the overall code rate of codes produced by soft combining of the initially transmitted and retransmitted packets is less than or equal to 1/5, each sub-code $C_i$ of the QCTC is repeatedly transmitted in the order of $C_0, C_1, C_2, ..., C_{S-1}$ at each retransmission request. This is packet diversity combining.

(Step 4) The QCTC set size can be an arbitrary value, determined by Rmax and Rmin. For R=1/5 and a sub-code code rate of 2/3 for retransmission, up to four sub-codes can be used.

Table 3 below lists QCTC sets for forward traffic channel packet data rates that are expected to be available in the present IS-2000 1XEVDV system. Here, a mother code rate R=1/5 and a sub-code code rate R=2/3, 1/3, or 1/6

TABLE 3

| Set size S | Code set | Sub-code rate set | Data rates |
|---|---|---|---|
| 1 | {$C_0$} | $C_0$: $R_0$ = 1/6 | 307.2 kbps |
|  |  |  | 153.6 kbps |
|  |  |  | 76.8 kbps |
|  |  |  | 38.4 kbps |
|  |  |  | 19.2 kbps |
| 2 | {$C_0, C_1$} | $C_0$: $R_0$ = 1/3 | 1228.8 kbps |
|  |  | $C_1$: $R_1$ = 1/3 | 921.6 kbps |
|  |  |  | 614.4 kbps |
|  |  |  | 307.2 kbps |
| 4 | {$C_0, C_1, C_2, C_3$} | $C_0$: $R_0$ = 2/3 | 2457.6 kbps |
|  |  | $C_1$: $R_1$ = 2/3 | 1843.2 kbps |
|  |  | $C_2$: $R_2$ = 2/3 | 1228.8 kbps |
|  |  | $C_3$: $R_3$ = 2/3 |  |

As seen from Table 3, for a sub-code code rate of 1/6 less than the mother code rate 1/5, the same code $C_0$ is used at each transmission. For a sub-code code rate of 1/3, greater than the mother code rate 1/5, a different code $C_0$ and $C_1$ is used at each transmission. In this case, the code set size S is 2. For a sub-code code rate of 2/3, greater than the mother code rate 1/5, a different code $C_0, C_1, C_2, C_3$ is used at each transmission. The code set size S is 4. When S sub-codes are all transmitted, the receiver can recover the mother code rate R and obtain the maxim coding gain offered by the encoder.

4. Puncturing Matrix for Quasi-Complementary Codes

Table 4 illustrates examples of a puncturing matrix for each sub-code code rate.

TABLE 4

| Code rates | $C_0$ | $C_1$ | $C_2$ | $C_3$ |
|---|---|---|---|---|
| R = 1/6 | $\begin{vmatrix} X \\ Y0 \\ Y1 \\ Y'0 \\ Y'1 \end{vmatrix} = \begin{vmatrix} 2 \\ 1 \\ 1 \\ 1 \\ 1 \end{vmatrix}$ | NA | NA | NA |
| R = 1/3 | $\begin{vmatrix} 1 \\ 1 \\ 0 \\ 1 \\ 0 \end{vmatrix}$ | $\begin{vmatrix} 1 \\ 0 \\ 1 \\ 0 \\ 1 \end{vmatrix}$ | NA | NA |
| R = 2/3 | $\begin{vmatrix} 0 & 1 \\ 1 & 0 \\ 0 & 0 \\ 0 & 1 \\ 0 & 0 \end{vmatrix}$ | $\begin{vmatrix} 1 & 0 \\ 0 & 1 \\ 0 & 0 \\ 1 & 0 \\ 0 & 0 \end{vmatrix}$ | $\begin{vmatrix} 0 & 1 \\ 0 & 0 \\ 1 & 0 \\ 0 & 0 \\ 0 & 1 \end{vmatrix}$ | $\begin{vmatrix} 1 & 0 \\ 0 & 0 \\ 0 & 1 \\ 0 & 0 \\ 1 & 0 \end{vmatrix}$ |
| R = 2/3 | $\begin{vmatrix} 1 & 1 & 1 & 1 \\ 1 & 0 & 0 & 0 \\ 0 & 0 & 0 & 0 \\ 0 & 0 & 1 & 0 \\ 0 & 0 & 0 & 0 \end{vmatrix}$ | $\begin{vmatrix} 0 & 0 & 0 & 0 \\ 0 & 1 & 1 & 1 \\ 0 & 0 & 0 & 0 \\ 1 & 1 & 0 & 1 \\ 0 & 0 & 0 & 0 \end{vmatrix}$ | $\begin{vmatrix} 0 & 0 & 0 & 0 \\ 0 & 0 & 0 & 0 \\ 1 & 1 & 0 & 1 \\ 0 & 0 & 0 & 0 \\ 0 & 1 & 1 & 1 \end{vmatrix}$ | $\begin{vmatrix} 1 & 1 & 1 & 1 \\ 0 & 0 & 0 & 0 \\ 0 & 0 & 1 & 0 \\ 0 & 0 & 0 & 0 \\ 1 & 0 & 0 & 0 \end{vmatrix}$ |

As shown in Table 4, when a rate 1/5 turbo code is used as a mother code and a rate 2/3 sub-code is generated with code symbols output for 4 information bits, 20 code symbols are generated from the 4 information bits. The rate 2/3 sub-code is generated by puncturing 14 symbols among the 20 symbols. For packet diversity combining of such sub-codes, $C_0$ produced from the above puncturing matrixes is repeatedly transmitted at each retransmission request. On the other hand, for packet code combining, a different code symbol is transmitted at each retransmission request. After transmitting all sub-codes $C_0$, $C_1$, $C_2$, $C_3$ in the set, the packet diversity combining is executed. For HARQ Type III using packet code combining, full code symbols of the mother code are decoded after four transmissions occur.

Meanwhile, "1"s in the puncturing matrixes of Table 4 indicate that the symbols at the positions are selected or transmitted and "0"s indicate that the symbols at the positions are punctured. A "2" indicates that the symbol at the position occurs twice. The puncturing (and repetition) matrixes are designed to satisfy the following conditions.

(Condition 1) An information symbol X is repeated in a sub-code of a QCTC when repetition is used.

(Condition 2) If the information symbol X is repeated in a sub-code of the QCTC using repetition, the repeating period is set to be a minimal constant in the QCTC having all sub-codes in combination.

(Condition 3) If puncturing is used, redundancy symbols except the information symbol X are punctured if possible in the sub-codes of the QCTC.

(Condition 4) If puncturing is used, redundancy symbols except the information symbol X are uniformly punctured if possible in the sub-codes of the QCTC.

A puncturing and repetition matrix with R=1/6 satisfying the above conditions will be described.

In Table 4, for R=1/6, the sequence of transmission code symbols are given as $C_0$: X, X, Y0, Y1, Y'0, Y'1, X, X, Y0, Y1, Y'0, Y'1, . . .

Because six code symbols are generated for the input of one information symbol, the code rate of the sub-code is 1/6. Concerning the puncturing and repetition matrix with R=1/6, decoding is carried out after the symbols X that occur twice are soft-combined and so the real code rate for the decoder is 1/5. The rate 1/5 code, having the energy of the information symbol X increased, has an improved performance, as compared to a rate 1/5 code having a uniform symbol energy across the symbols. In other words, the most appropriate symbol to be repeated is an information symbol. It can be said that the puncturing and repetition matrix with R=1/6 shown in Table 4 is constructed in such a way that information symbol energy is increased through uniform repetition of the information symbols.

For R=1/3, the sequence of transmission code symbols are given as $C_0$: X, Y0, Y'0, X, Y0, Y'0, X, Y0, Y'0, X, Y0, Y'0, . . .
$C_1$: X, Y1, Y'1, X, Y1, Y'1, X, Y1, Y'1, X, Y1, Y'1, . . .

Because three code symbols are generated for the input of one information symbol, the code rate of the sub-code is 1/3. A different code is transmitted at each transmission due to the use of a different puncturing matrix. After soft combining of $C_0$ and $C_1$, X occurs twice and each of Y0, Y1, Y'0 and Y'1 occurs once. The decoder with a code rate 1/5 can be used in this case and the puncturing matrixes satisfy the above-described conditions, ensuring performance.

In the first case with R=2/3 shown in Table 4, the sequence of transmission code symbols are given as $C_0$: Y0, X, Y'0, Y0, X, Y'0, Y0, X, Y'0, Y0, X, Y'0, . . .
$C_1$: X, Y'0, Y0, X, Y'0, Y0, X, Y'0, Y0, X, Y'0, Y0, . . .
$C_2$: Y1, X, Y'1, Y1, X, Y'1, Y1, X, Y'1, Y1, X, Y'1, . . .
$C_3$: X, Y'1, Y1, X, Y'1, Y1, X, Y'1, Y1, X, Y'1, Y1, . . .

Because three code symbols are generated for the input of two information symbols, the code rate of the sub-code is 2/3. A different code is transmitted at each transmission due to the use of a different puncturing matrix. After soft combining of $C_0$, $C_1$, $C_2$, $C_3$, X occurs twice and each of Y0, Y1, Y'0 and Y'1 occurs once. The decoder with a code rate 1/5 can be used also in this case as for R=1/6 and the puncturing matrixes satisfy the above-described conditions, ensuring performance.

In the second case with R=2/3 shown in Table 4, the sequence of transmission code symbols are given as $C_0$: X, Y0, X, X, Y'0, X, X, Y0, X, X, Y'0, X, X, Y0, X, X, Y'0, X, . . .
$C_1$: Y'0, Y0, Y'0, Y0, Y0, Y'0, Y'0, Y0, Y'0, Y0, Y0, Y'0, . . .
$C_2$: Y1, Y1, Y'1, Y'1, Y1, Y'1, Y1, Y1, Y'1, Y'1, Y1, Y'1, . . .
$C_3$: X, Y'1, X, X, Y'1, X, X, Y'1, X, X, Y'1, X, . . .

Because six code symbols are generated for the input of four information symbols, the code rate of the sub-code is 2/3. A different code is transmitted at each transmission due to the use of a different puncturing matrix. After soft combining of $C_0$, $C_1$, $C_2$, $C_3$, X occurs twice and each of Y0, Y1, Y'0 and Y'1 occurs once. The decoder with a code rate 1/5 can be used also in this case as for R=1/6 and the puncturing matrixes satisfy the above-described conditions, ensuring performance.

C. Transmission Protocol

If an HARQ Type III scheme is adopted in a communication system for transmitting packets on a traffic channel, a transmission protocol for each packet is applicable to both a forward traffic channel and a reverse traffic channel. Therefore, the bi-directional traffic channels will be termed as "traffic channels" collectively unless there is a need for discriminating them.

1. Transmission Packet Length and Physical Channel

If an HARQ Type III scheme is adopted in a communication system for transmitting packets on a traffic channel, packet length is variable. When one packet to be transmitted is defined as a physical layer packet (PLP), one PLP may include a plurality of sub-packets called TUs and each TU is also variable in length. Thus, PLP length is variable. Needless to say, one TU can be transmitted in one PLP. The number of TUs can be determined according to the data rate of the physical channel. However, only the case where one PLP is 1 TU, 2 TU, 3 TU or 4 TU in length will be considered in the following description for sake of clarity. Also, a TU has 768 bits or 1536 bits by way of example. The former will be called a short format and the latter, a long format.

A transmission unit for one PLP on a physical channel is defined as a slot. That is, one PLP is transmitted on a slot basis. The number of data per slot is variable from 1 to any number, determined by the data rate available from the physical transmission channel. In other words, the number of slots is determined according to the data rate for a PLP. By way of example, two cases are considered: a packet transmitted in a short format with 1 to 32 slots and a packet transmitted in a long format with 2 to 64 slots. This kind of classification is equivalent to the discrimination between TU=768 and TU=1536. On the assumption that a PLP with TU=768 is transmitted in up to 16 slots, the PLP with the TU length is defined as a short format. On the other hand, a PLP with TU=1536 transmitted in up to 32 slots is defined as a long format. The definitions are made based on packet length and have no fundamental relation with the implementation of the HARQ Type III protocol. Yet, they influence the packet length-related system throughput.

2. Transmission Code Selection for Traffic Channel

A PLP is encoded using a quasi-complementary code selected for each transmission on a traffic channel. A complementary code set with a set size S is determined according to a PLP data rate for the traffic channel in Table 5 and Table 6 and for an initial transmission, a sub-code $C_0$ is selected from the complementary code set. Then, every time NACK is received on a reverse channel (e.g., a reverse ACK channel), codes are selected in the circulating order of $C_1, C_2, \ldots, C_{S-1}, C_0, C_1, \ldots$ Table 5 and Table 6 illustrate complementary code sets for the data rates of PLPs in a short format and in a long format, respectively.

| Data Rates (kbps) | Slots/ PLP | TU/ PLP | Code Rate | Repetition | ACK/NACK Period (slots) | ACK Indicator Bits/Reverse ACK Channel | Quasi Complementary Code Set |
|---|---|---|---|---|---|---|---|
| 19.2 | 32 | 1 | 1/6 | 16 | 2 × 4 | 1 | {$C_0$} |
| 38.4 | 16 | 1 | 1/6 | 8 | 2 × 4 | 1 | {$C_0$} |
| 76.6 | 8 | 1 | 1/6 | 4 | 2 × 4 | 1 | {$C_0$} |
| 153.6 | 4 | 1 | 1/6 | 2 | 2 × 4 | 1 | {$C_0$} |
| 307.2 | 2 | 1 | 1/6 | 1 | 2 × 4 | 1 | {$C_0$} |
| 614.4 | 1 | 1 | 1/3 | 1 | 1 × 4 | 1 | {$C_0, C_1$} |
| 307.2 | 4 | 2 | 1/3 | 2 | 2 × 4 | 2 | {$C_0, C_1$} |
| 614.4 | 2 | 2 | 1/3 | 1 | 2 × 4 | 2 | {$C_0, C_1$} |
| 1228.8 | 1 | 2 | 2/3 | 1 | 1 × 4 | 2 | {$C_0, C_1, C_2, C_3$} |
| 921.6 | 2 | 3 | 1/3 | 1 | 2 × 4 | 3 | {$C_0, C_1$} |
| 1843.2 | 1 | 3 | 2/3 | 1 | 1 × 4 | 3 | {$C_0, C_1, C_2, C_3$} |
| 1228.8 | 2 | 4 | 1/3 | 1 | 2 × 4 | 4 | {$C_0, C_1$} |
| 2457.6 | 1 | 4 | 2/3 | 1 | 1 × 4 | 4 | {$C_0, C_1, C_2, C_3$} |

TABLE 6

| Data Rates (kbps) | Slots/ PLP | TU/ PLP | Code Rate | Repetition | ACK/NACK Period (slots) | ACK Indicator Bits/Reverse ACK Channel | Quasi Complementary Code Set |
|---|---|---|---|---|---|---|---|
| 19.2 | 32 | 1 | 1/6 | 16 | 2 × 8 | 1 | {$C_0$} |
| 38.4 | 16 | 1 | 1/6 | 8 | 2 × 8 | 1 | {$C_0$} |
| 76.6 | 8 | 1 | 1/6 | 4 | 2 × 8 | 1 | {$C_0$} |
| 153.6 | 4 | 1 | 1/6 | 2 | 2 × 8 | 1 | {$C_0$} |
| 307.2 | 2 | 1 | 1/6 | 1 | 2 × 8 | 1 | {$C_0$} |
| 614.4 | 1 | 1 | 1/3 | 1 | 1 × 8 | 1 | {$C_0, C_1$} |
| 307.2 | 4 | 2 | 1/3 | 2 | 2 × 8 | 2 | {$C_0, C_1$} |
| 614.4 | 2 | 2 | 1/3 | 1 | 2 × 8 | 2 | {$C_0, C_1$} |
| 1228.8 | 1 | 2 | 2/3 | 1 | 1 × 8 | 2 | {$C_0, C_1, C_2, C_3$} |
| 921.6 | 2 | 3 | 1/3 | 1 | 2 × 8 | 3 | {$C_0, C_1$} |
| 1843.2 | 1 | 3 | 2/3 | 1 | 1 × 8 | 3 | {$C_0, C_1, C_2, C_3$} |
| 1228.8 | 2 | 4 | 1/3 | 1 | 2 × 8 | 4 | {$C_0, C_1$} |
| 2457.6 | 1 | 4 | 2/3 | 1 | 1 × 8 | 4 | {$C_0, C_1, C_2, C_3$} |

If three consecutive NACKs are received on the reverse ACK channel, sub-codes are used in the order of $C_1$, $C_2$, and $C_3$ for the forward traffic channel. If two more NACKs are received, the sub-codes $C_0$ and $C_1$ are used. If ACK is then received, transmission is discontinued and a new PLP is transmitted on the forward traffic channel. The transmitter does not notify information about a quasi-complementary code for each retransmission but information about a quasi-complementary code sets with a set size S determined according to the data rates are known beforehand to both the transmitter and the receiver.

3. Structure of Transmission Traffic Packet and Transmission Method

In a system that transmits a packet in a single slot or in multiple slots, code symbols produced for one PLP can be transmitted in one or more slots according to transmission schemes. Before presenting a description of the transmission schemes, conditions to be considered for efficient packet transmission will be first described below.

(Necessary Condition 1)

Determination of packet length and packet structure in such a way that one physical channel transmission frame includes one code symbol minimizes the implementation complexity of a receiver and simplifies a transmission protocol for a transmitter in a system that generates code symbols at a variable or fixed code rate and transmits the code symbols in a packet diversity combining scheme or in a packet code combining scheme.

(Necessary Condition 2)

Minimization of the difference between a code length for each code rate and the length of a physical channel transmission frame maximizes system throughput in the system that generates code symbols at a variable or fixed code rate and transmits the code symbols in a packet diversity combining scheme or in a packet code combining scheme.

(Necessary Condition 3)

Periodic transmission of an ACK/NACK message for each transmission codeword to the transmitter increases the system throughput in the system that generates code symbols at a variable or fixed code rate and transmits the code symbols in a packet diversity combining scheme or in a packet code combining scheme.

Considering the above conditions, it is most preferable to match a code length for each code rate to the length of a physical transmission frame. However, various types of codewords are required and the complexity of the receiver and the transmission protocol increases.

As stated before, it is a requirement for optimal transmission to determine packet length and packet structure so that one physical channel transmission frame includes one code symbol for each code rate in a system that generates code symbols (sub-codes) at a variable or fixed code rate and transmits the code symbols (sub-codes) in a packet diversity combining scheme or in a packet code combining scheme. However, it is not each because the frame length is a parameter determined by the specification of the physical channel. This is the reason why padding bits are used though inefficient, or while a ratio of the frame length to the codeword length is not an integer, codewords are successively transmitted and the receiver combines them in transmission frames and then re-separates them. These conventional methods also exhibit limitations in accurately matching the codeword length to the transmission frame length, which gives rise to the following problems:

1. If the codeword length for each code rate is less than the frame length, padding bits can be additionally inserted in the remaining symbol positions of the transmission frame. Yet, the system throughput is reduced due to the padding bits. Specifically for a lower data rate, the loss increases.

2. If the codeword length for each code rate is less than the frame length, codes with a variety of code rates for each data rate are required to allow transmission of one codeword in one transmission frame on a physical channel. In reality, the number of available code rates is limited because most code rates are obtained from mother codes through puncturing and repetition. Moreover, there still remains symbol positions to be filled in a transmission frame and in most cases, with padding bits. Despite using of less padding bits, the system throughput is also reduced.

3. It can be contemplated instead of adding padding bits that a ratio of the frame length to the codeword length not being an integer, a plurality of transmission frames are serially concatenated and then one codeword after another is transmitted successively. In this case, the receiver must combine codewords at a transmission frame level and then separate the transmission frames into codewords. Here, one transmission frame can transmit a plurality of codewords, which implies that different codewords can be used for a transmission frame with the same physical channel parameter. However, discrimination between the different codewords is very challenging to the receiver. The difficulty can be relieved by using information symbols indicative of changes in the codewords in one transmission frame, resulting in the requirement of a memory for storing the codewords and a controller for controlling the memory.

Accordingly, the present invention proposes novel packet transmission schemes. The length of a physical channel frame or the total number of symbols in all transmittable successive transmission frames is defined as the number of transmittable modulation symbols for each time period in which a PLP information bit stream is assigned. The length of a sub-codeword or the number of sub-code symbols for each code rate is defined as the number of the modulation symbols of the sub-code, determined by a modulation method for each time period in which a PLP information bit stream is assigned.

(Transmission Method 1)

The total number of symbols in all transmittable successive transmission frames is divided by the number of symbols in a codeword and code symbols are transmitted in the divided transmission frames (slots). The boundaries of real transmission frames are not considered in the division and the same code rate is used in this transmission method. Up to two different codewords may be mixed in each slot. If the total length of the transmission frames is not an integer-multiple of the code length, unused extra symbols can exist in the last transmission frame. These extra symbols can be used for soft symbol combining in the receiver, but the transmission frame does not eventually transmit one full codeword. The code rate Rc of each sub-code in Transmission Method 1 is calculated by $$Rc=(L \times RP)/(N-L) \quad (8)$$

where N is the total number of symbols in all transmittable successive transmission frames, L is the number of symbols in the sub-code, RP is the repetition time of the sub-code, and (N−L) is the number of unused extra symbols in the last transmission frame.

(Transmission Method 2)

The total number of symbols in all successive transmission frames available for transmission of one PLP is divided by the number of code symbols in each sub-code and code symbols are transmitted in the divided transmission frames (slots), so that the termination of a transmission frame is matched to that of a codeword. Here, the same code rate is used or difference code rates are used in combination. According to this transmission method, one type of sub-code is transmitted in each slot. If the total length of the transmission frames is not an integer-multiple of the code length, the following two approaches can be taken.

(Transmission Method 2-1)

The code rate of each sub-code is determined in such a way that the sub-code can be fully transmitted in an assigned transmission frame. The code rate Rc of the sub-code is determined by $$Rc = (L \times RP)/N \qquad (9)$$

where N is the total number of symbols in all transmittable successive transmission frames, L is the number of symbols in the sub-code, and RP is the repetition time of the sub-code.

(Transmission Method 2-2)

The code rate of each sub-code is determined in such a way that the sub-code can be fully transmitted in an assigned transmission frame, the number of sub-code symbols for the code rate is set to be larger than the number of symbols per transmission frame, and the remaining symbols are pruned. An optimal code rate for each sub-code is a minimum code rate that minimizes the number of pruned symbols. The code rate Rc of the sub-code is determined by $$Rc = (L \times RP)/N \qquad (10)$$

and the number of pruned symbols, PS is given by $$PS = L - (N/RP) \qquad (11)$$

where N is the total number of symbols in all transmittable successive transmission frames, L is the number of symbols in the sub-code, and RP is the repetition time of the sub-code.

In a comparison between Transmission Method (2-1) and Transmission Method (2-2), the former allows transmission at a lower code rate for the same time period than the latter on the assumption that N is identical. Therefore, Transmission Method (2-2) has a higher coding gain in terms of coding theory. Another advantage with Transmission Method (2-2) is that it enables the code rate of each sub-codeword to be equal and provides a performance gain. Although control of pruned symbols is required, use of a counter for counting the number of transmitted symbols will satisfy the requirement because symbol pruning is a discontinuation of symbols at a predetermined time point.

The above-described traffic packet transmission methods can be selectively adopted according to system characteristics. The structure of a transmission packet constructed in Transmission Method (2-2) will be described referring to Table 7 to Table 10 and FIGS. 6 to 23.

Table 7 and Table 8 illustrate the cases where packet data are transmitted on a traffic channel in a short format (e.g., single format) and a long format (e.g., double format), respectively. For each data rate, these tables list the number of slots per PLP, the number of bits per PLP, the number of TDM (Time Division Multiplexing) chips in transmission duration, pilot chips, data chips, a ratio of available Walsh codes with respect to 32 Walsh codes, and the number of available modulation symbols for one PLP. The number of TDM chips is the sum of the number of preamble symbols, the number of pilot chips, and the number of data chips. The number of available modulation symbols is the product of the available Walsh ratio and the number of data chips. For example, 49152 TDM chips are produced by summing 1024 preamble symbols, 8192 pilot chips, and 39936 data chips, for a data rate of 19.2 kbps in Table 7. For the same data rate, 34944 available modulation symbols are calculated by multiplying 39936 data chips by an available Walsh ratio 28/32.

TABLE 7

| Data Rates | Slots/PLP | Bits in PLP | Available Walsh Ratio | Preamble Symbols | Pilot Chips | Data Chips | Available Data Modulation Symbols | TDM Chips |
|---|---|---|---|---|---|---|---|---|
| 19.2 kbps | 32 | 768 | 28/32 | 1024 | 8192 | 39936 | 34944 | 49152 |
| 38.4 kbps | 16 | 768 | 28/32 | 1024 | 4096 | 19456 | 17024 | 24576 |
| 76.8 kbps | 8 | 768 | 28/32 | 512 | 2048 | 9728 | 8512 | 12288 |
| 153.6 kbps | 4 | 768 | 28/32 | 256 | 1024 | 4864 | 4256 | 6144 |
| 307.2 kbps | 2 | 768 | 28/32 | 128 | 512 | 2432 | 2128 | 3072 |
| 614.4 kbps | 1 | 768 | 28/32 | 64 | 256 | 1216 | 1064 | 1536 |
| 307.2 kbps | 4 | 1,536 | 28/32 | 128 | 1024 | 4992 | 4368 | 6144 |
| 614.4 kbps | 2 | 1,536 | 28/32 | 64 | 512 | 2496 | 2184 | 3072 |
| 1,228.8 kbps | 1 | 1,536 | 28/32 | 64 | 256 | 1216 | 1064 | 1536 |
| 921.6 kbps | 2 | 2,304 | 28/32 | 64 | 512 | 2496 | 2184 | 3072 |
| 1,843.2 kbps | 1 | 2,304 | 28/32 | 64 | 256 | 1216 | 1064 | 1536 |
| 1,228.8 kbps | 2 | 3,072 | 28/32 | 64 | 512 | 2496 | 2184 | 3072 |
| 2,457.6 kbps | 1 | 3,072 | 28/32 | 64 | 256 | 1216 | 1064 | 1536 |

TABLE 8

| Data Rates | Slots/PLP | Bits in PLP | Available Walsh Ratio | Preamble Symbols | Pilot Chips | Data Chips | Available Data Modulation Symbols | TDM Chips |
|---|---|---|---|---|---|---|---|---|
| 19.2 kbps | 64 | 1,536 | 28/32 | 1024 | 16,384 | 80,896 | 70784 | 98304 |
| 38.4 kbps | 32 | 1,536 | 28/32 | 1024 | 8192 | 39,936 | 34944 | 49152 |
| 76.8 kbps | 16 | 1,536 | 28/32 | 512 | 4096 | 19,968 | 17472 | 24576 |
| 153.6 kbps | 8 | 1,536 | 28/32 | 256 | 2048 | 9,984 | 8736 | 12288 |
| 307.2 kbps | 4 | 1,536 | 28/32 | 128 | 1024 | 4,492 | 4368 | 6144 |
| 614.4 kbps | 2 | 1,536 | 28/32 | 64 | 512 | 2,496 | 2184 | 3072 |

TABLE 8-continued

| Data Rates | Slots/PLP | Bits in PLP | Available Walsh Ratio | Preamble Symbols | Pilot Chips | Data Chips | Available Data Modulation Symbols | TDM Chips |
|---|---|---|---|---|---|---|---|---|
| 307.2 kbps | 8 | 3,072 | 28/32 | 128 | 2,048 | 10,112 | 8848 | 12288 |
| 614.4 kbps | 4 | 3,072 | 28/32 | 64 | 1024 | 5,056 | 4424 | 6144 |
| 1,228.8 kbps | 2 | 3,072 | 28/32 | 64 | 512 | 2,496 | 2184 | 3072 |
| 921.6 kbps | 4 | 4,608 | 28/32 | 64 | 1,024 | 5,056 | 4424 | 6144 |
| 1,843.2 kbps | 2 | 4,608 | 28/32 | 64 | 512 | 2,496 | 2184 | 3072 |
| 1,228.8 kbps | 4 | 6,144 | 28/32 | 64 | 1,024 | 5,056 | 4424 | 6144 |
| 2,457.6 kbps | 2 | 6,144 | 28/32 | 64 | 512 | 2,496 | 2184 | 3072 |

Table 9 and Table 10 illustrate the cases where packet data are transmitted on a traffic channel in a short format (e.g., single format) and a long format (e.g., double format), respectively. For each data rate, these tables list the number of slots per PLP, the number of bits per PLP, the number of modulation symbols provided for the slots of one PLP by a modulator, the number of modulation symbols needed for code symbols generated from an encoder, the repetition number of a codeword corresponding to one PLP in the overall assigned slots (number of pruned sequence transmission), the number of pruned modulation symbol for one PLP in a slot, and an effective code rate.

In Table 9 and Table 10, the number of pruned modulation symbols is calculated by multiplying the number of modulation symbols provided by the number of pruned sequence transmission and subtracting the number of modulation symbols from the product. For a data rate of 19.2 kbps in Table 9, for example, 1,920 pruned modulation symbols are determined by multiplying 2,304 modulation symbols provided by the number of pruned modulation symbols, 16 and subtracting 34,944 modulation symbols needed from the product. The number of modulation symbols provided is the number of modulation symbols generated by modulating one PLP in a predetermined modulation method in a modulator. The number of modulation symbols needed is the number of modulation symbols generated by modulating sub-code symbols in the same modulation method. According to the present invention, a sub-code is generated for a predetermined time period and modulated prior to transmission. Here, there is a difference between the number of modulation symbols for the sub-code and that for the PLP. Therefore, as many symbols as the difference are pruned. As seen from Table 9 and Table 10, the number of pruned modulation symbols is set for each data rate and thus a transmission packet structure is determined based on the number of pruned modulation symbols.

TABLE 9

| Data Rates | Slots/PLP | Bits in PLP | Number of Modulation Symbols Provided | Number of Modulation Symbols Needed | Number of pruned Modulation Symbols | Number of Pruned Sequence Transmissions | Code Rate | Effective Code Rate |
|---|---|---|---|---|---|---|---|---|
| 19.2 kbps | 32 | 768 | 2,304 | 34,944 | 1,920 | 16 | 1/6 | 0.176 |
| 38.4 kbps | 16 | 768 | 2,304 | 17,024 | 1,408 | 8 | 1/6 | 0.180 |
| 76.8 kbps | 8 | 768 | 2,304 | 8,512 | 704 | 4 | 1/6 | 0.180 |
| 153.6 kbps | 4 | 768 | 2,304 | 4,256 | 352 | 2 | 1/6 | 0.180 |
| 307.2 kbps | 2 | 768 | 2,304 | 2,128 | 176 | 1 | 1/6 | 0.180 |
| 614.4 kbps | 1 | 768 | 1,152 | 1,064 | 88 | 1 | 1/3 | 0.361 |
| 307.2 kbps | 4 | 1,536 | 2,304 | 4,368 | 240 | 2 | 1/3 | 0.352 |
| 614.4 kbps | 2 | 1,536 | 2,304 | 2,184 | 120 | 1 | 1/3 | 0.352 |
| 1,228.8 kbps | 1 | 1,536 | 1,152 | 1,064 | 88 | 1 | 2/3 | 0.722 |
| 921.6 kbps | 2 | 2,304 | 2,304 | 2,184 | 120 | 1 | 1/3 | 0.352 |
| 1,843.2 kbps | 1 | 2,304 | 1,152 | 1,064 | 88 | 1 | 2/3 | 0.722 |
| 1,228.8 kbps | 2 | 3,072 | 2,304 | 2,184 | 120 | 1 | 1/3 | 0.352 |
| 2,457.6 kbps | 1 | 3,072 | 1,152 | 1,064 | 88 | 1 | 2/3 | 0.722 |

TABLE 10

| Data Rates | Slots/PLP | Bits in PLP | Number of Modulation Symbols Provided | Number of Modulation Symbols Needed | Number of pruned Modulation Symbols | Number of Pruned Sequence Transmission | Code Rate | Effective Code Rate |
|---|---|---|---|---|---|---|---|---|
| 19.2 kbps | 64 | 1,536 | 4,608 | 70,784 | 2,944 | 16 | 1/6 | 0.174 |
| 38.4 kbps | 32 | 1,536 | 4,608 | 34,944 | 1,920 | 8 | 1/6 | 0.176 |
| 76.8 kbps | 16 | 1,536 | 4,608 | 17,472 | 960 | 4 | 1/6 | 0.176 |
| 153.6 kbps | 8 | 1,536 | 4,608 | 8,736 | 480 | 2 | 1/6 | 0.176 |
| 307.2 kbps | 4 | 1,536 | 4,608 | 4,368 | 240 | 1 | 1/6 | 0.176 |
| 614.4 kbps | 2 | 1,536 | 2,304 | 2,184 | 120 | 1 | 1/3 | 0.352 |
| 307.2 kbps | 8 | 3,072 | 4,608 | 8,848 | 368 | 2 | 1/3 | 0.347 |

TABLE 10-continued

| Data Rates | Slots/PLP | Bits in PLP | Number of Modulation Symbols Provided | Number of Modulation Symbols Needed | Number of pruned Modulation Symbols | Number of Pruned Sequence Transmission | Code Rate | Effective Code Rate |
|---|---|---|---|---|---|---|---|---|
| 614.4 kbps | 4 | 3,072 | 4,608 | 4,424 | 184 | 1 | 1/3 | 0.347 |
| 1,228.8 kbps | 2 | 3,072 | 2,304 | 2,184 | 120 | 1 | 2/3 | 0.703 |
| 921.6 kbps | 4 | 4,608 | 4,608 | 4,424 | 184 | 1 | 1/3 | 0.347 |
| 1,843.2 kbps | 2 | 4,608 | 2,304 | 2,184 | 120 | 1 | 2/3 | 0.703 |
| 1,228.8 kbps | 4 | 6,144 | 4,608 | 4,424 | 184 | 1 | 1/3 | 0.347 |
| 2,457.6 kbps | 2 | 6,144 | 2,304 | 2,184 | 120 | 1 | 2/3 | 0.703 |

FIGS. 6 to 23 illustrate PLP transmission for each data rate according to embodiment of the present invention.

Referring to FIGS. 6 to 23, each PLP is preceded with a preamble by which the PLP is identified. Modulation symbols modulated from sub-code symbols follow the preamble. Modulation symbols marked in the figures are to be pruned prior to transmission of the physical channel. The numbers of generated modulation symbols and pruned modulation symbols are different according to data rates. If a PLP is transmitted in a plurality of slots, repetition occurs on a codeword basis and the number of pruned symbols is always the same for the quasi-complementary codes except for the first quasi-complementary code, as seen from FIGS. 10 to 14 and FIGS. 19 to 23. Reference characters $C_0$, $C_1$, $C_2$, $C_3$, ... denote sub-codes and reference characters $P_0$, $P_1$, $P_2$, $P_3$, ... denote pruned symbols among modulation symbols corresponding to a sub-code. Sub-codes are changed in the order of $C_0$, $C_1$, $C_2$, $C_3$, ... for retransmissions of packet data having errors.

Figure 6:
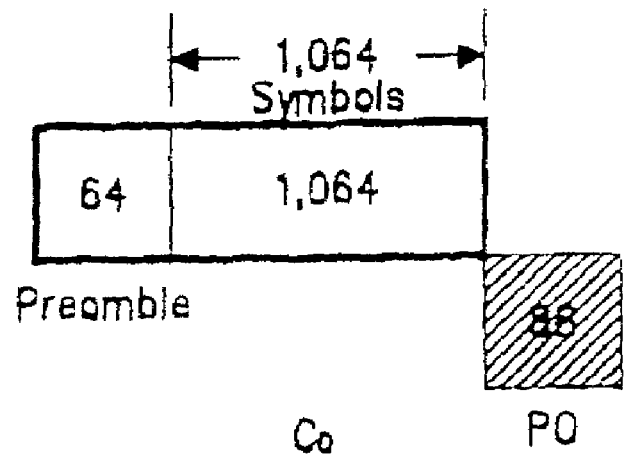
FIG. 6 illustrates an embodiment of a transmission packet structure in a single format according to the present invention.

FIG. 6 illustrates an embodiment of a transmission packet of a single format according to the present invention. A preamble, a pilot, and data are multiplexed in one slot for data rates of 1228.8, 1843.2, and 2457.6 kbps in the $9^{th}$, $11^{th}$, and $13^{th}$ rows of Table 9.

Figure 7:
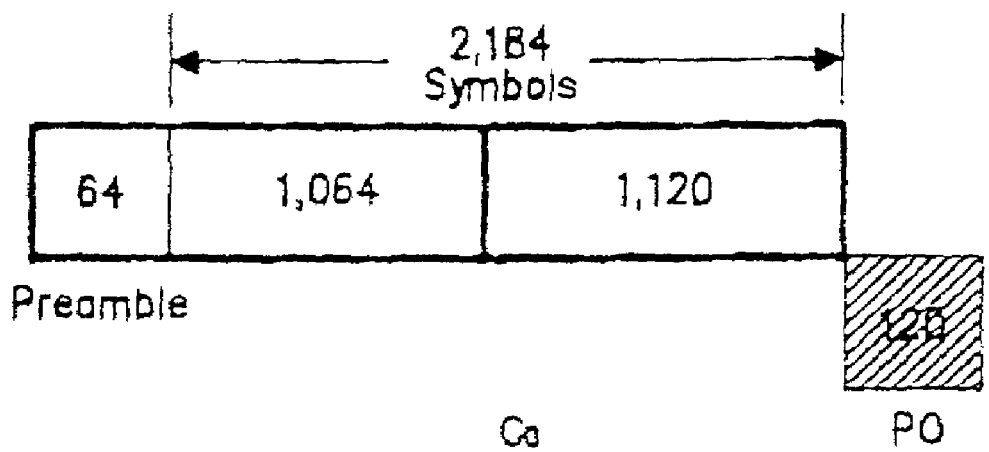
FIG. 7 illustrates another embodiment of the transmission packet structure in a single format according to the present invention.

FIG. 7 illustrates another embodiment of the transmission packet of a single format according to the present invention. A preamble, a pilot, and data are multiplexed in two slots for data rates of 614.4, 921.6, and 1228.8 kbps in the $8^{th}$, $10^{th}$, and $12^{th}$ rows of Table 9.

Figure 8:
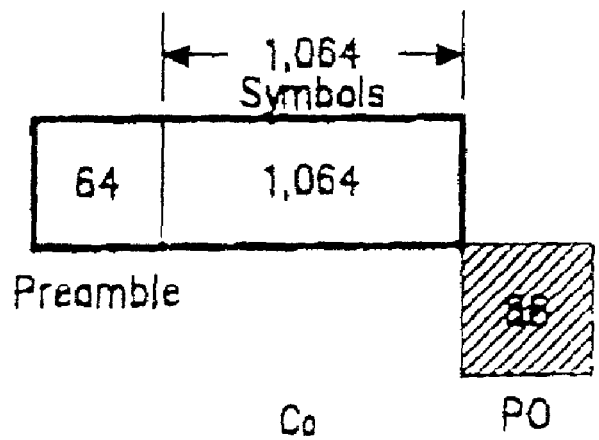
FIG. 8 illustrates a third embodiment of the transmission packet structure in a single format according to the present invention.

FIG. 8 illustrates a third embodiment of the transmission packet of a single format according to the present invention. A preamble, a pilot, and data are multiplexed in one slot for a data rate of 614.4 kbps in the $6^{th}$ row of Table 9.

Figure 9:
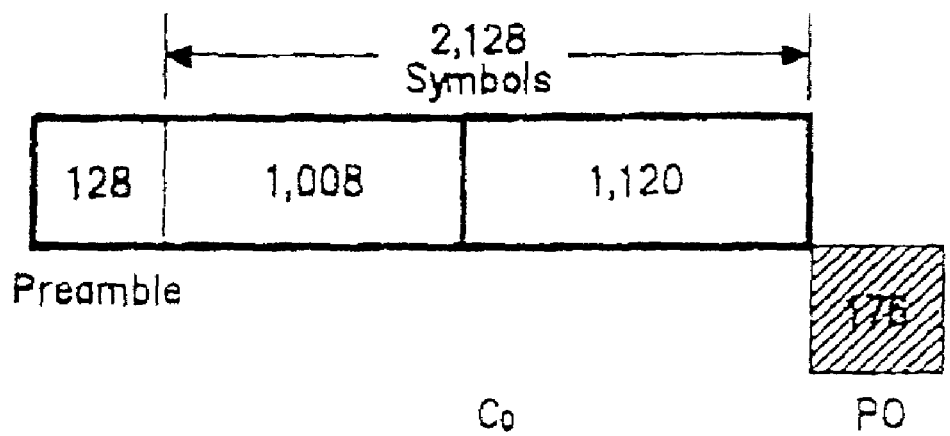
FIG. 9 illustrates a fourth embodiment of the transmission packet structure in a single format according to the present invention.

FIG. 9 illustrates a fourth embodiment of the transmission packet of a single format according to the present invention. A preamble, a pilot, and data are multiplexed in two slots for a data rate of 307.2 kbps in the $5^{th}$ row of Table 9.

Figure 10:
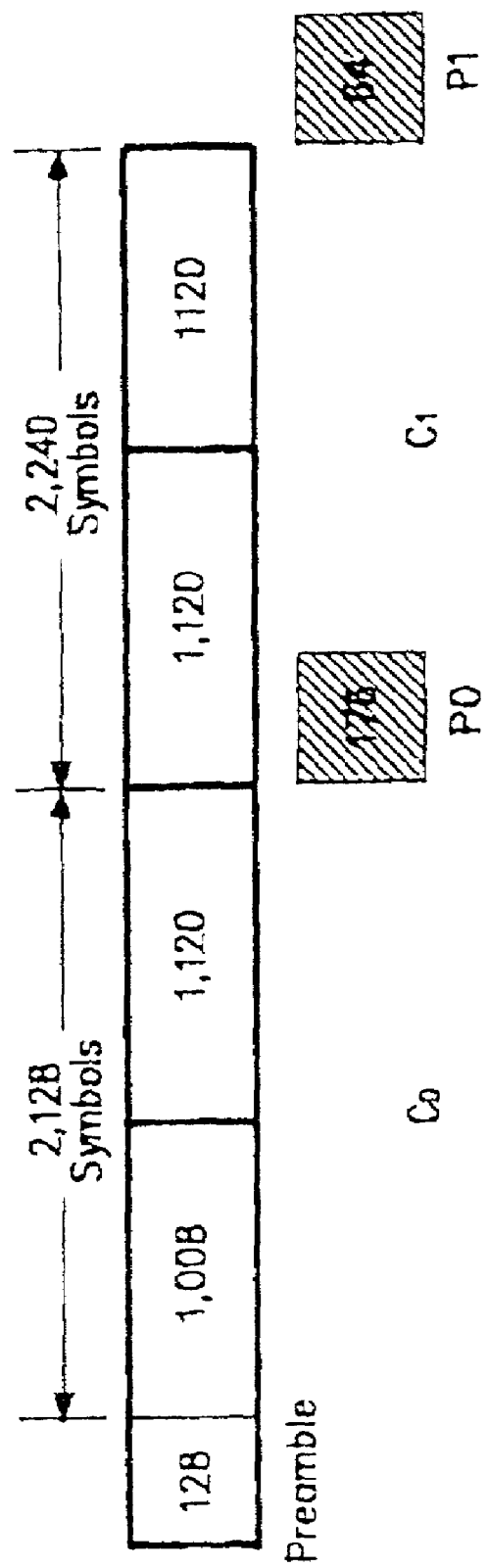
FIG. 10 illustrates a fifth embodiment of the transmission packet structure in a single format according to the present invention.

FIG. 10 illustrates a fifth embodiment of the transmission packet of a single format according to the present invention. A preamble, a pilot, and data are multiplexed in four slots for a data rate of 307.2 kbps in the $7^{th}$ row of Table 9.

Figure 11:
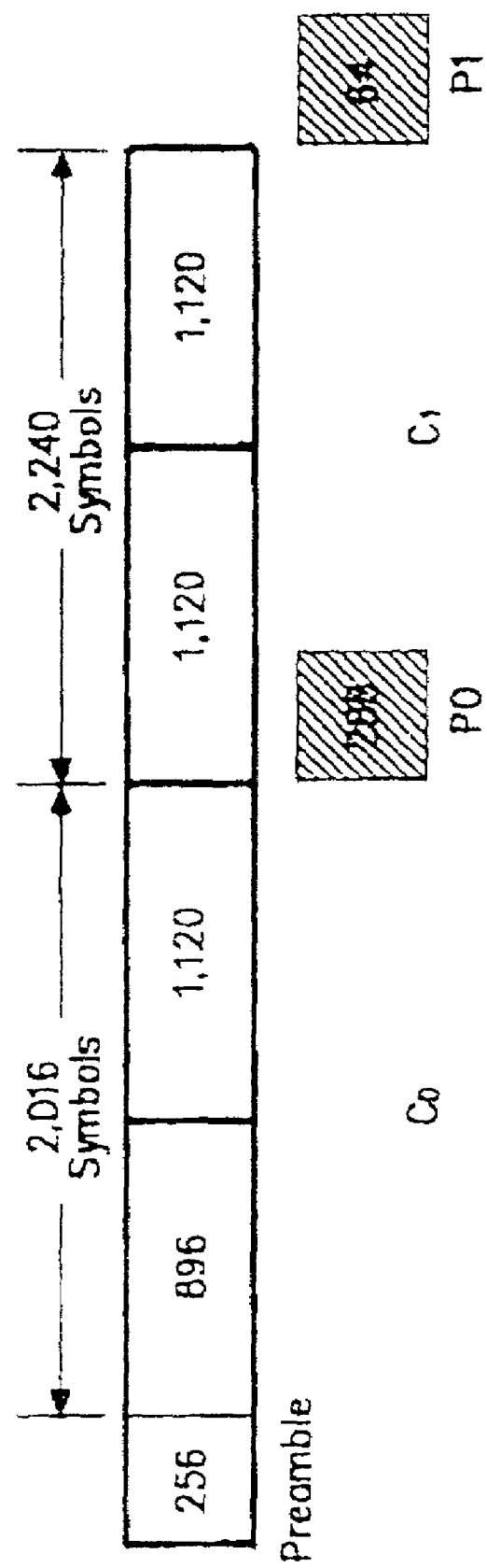
FIG. 11 illustrates a sixth embodiment of the transmission packet structure in a single format according to the present invention.

FIG. 11 illustrates a sixth embodiment of the transmission packet of a single format according to the present invention. A preamble, a pilot, and data are multiplexed in four slots for a data rate of 153.6 kbps in the $4^{th}$ row of Table 9.

Figure 12:
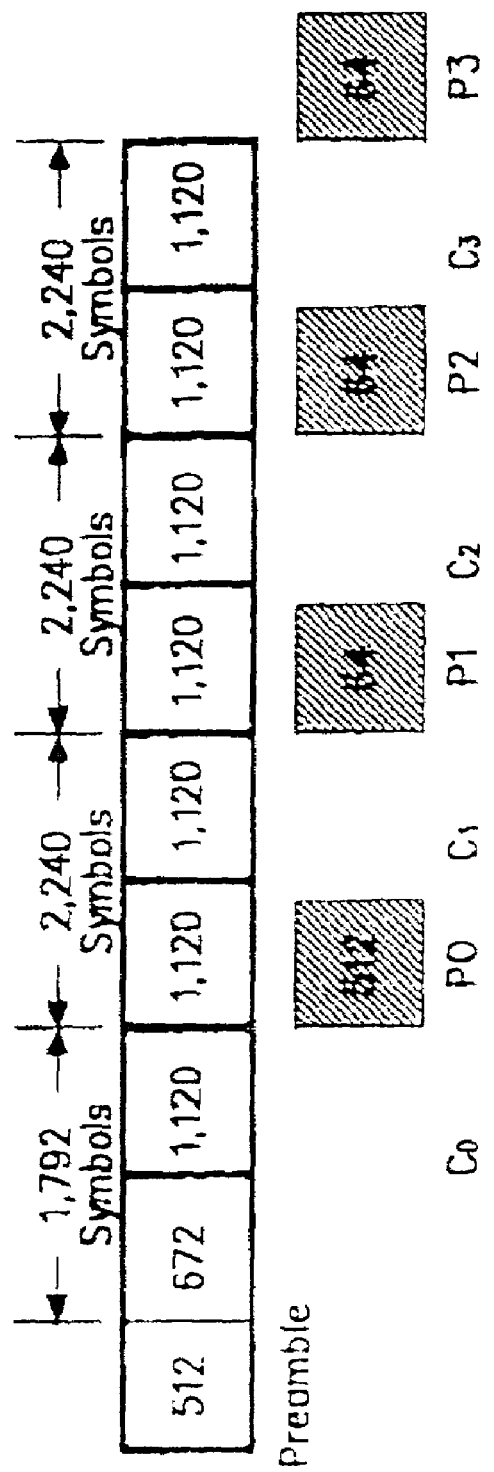
FIG. 12 illustrates a seventh embodiment of the transmission packet structure in a single format according to the present invention.

FIG. 12 illustrates a seventh embodiment of the transmission packet of a single format according to the present invention. A preamble, a pilot, and data are multiplexed in eight slots for a data rate of 76.8 kbps in the $3^{rd}$ row of Table 9.

Figure 13:
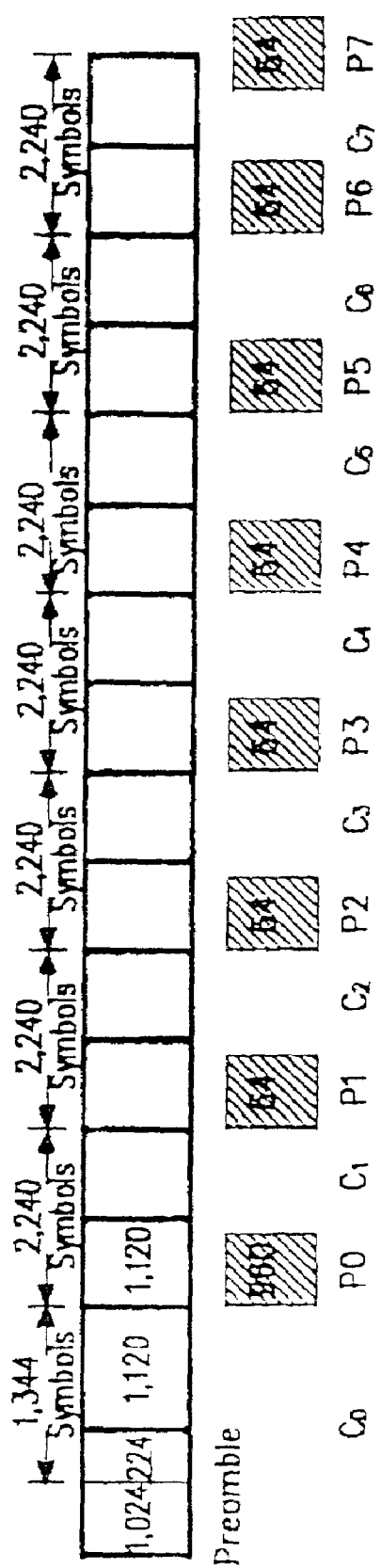
FIG. 13 illustrates an eighth embodiment of the transmission packet structure in a single format according to the present invention.

FIG. 13 illustrates an eighth embodiment of the transmission packet of a single format according to the present invention. A preamble, a pilot, and data are multiplexed in 16 slots for a data rate of 38.4 kbps in the $2^{nd}$ row of Table 9.

Figure 14:
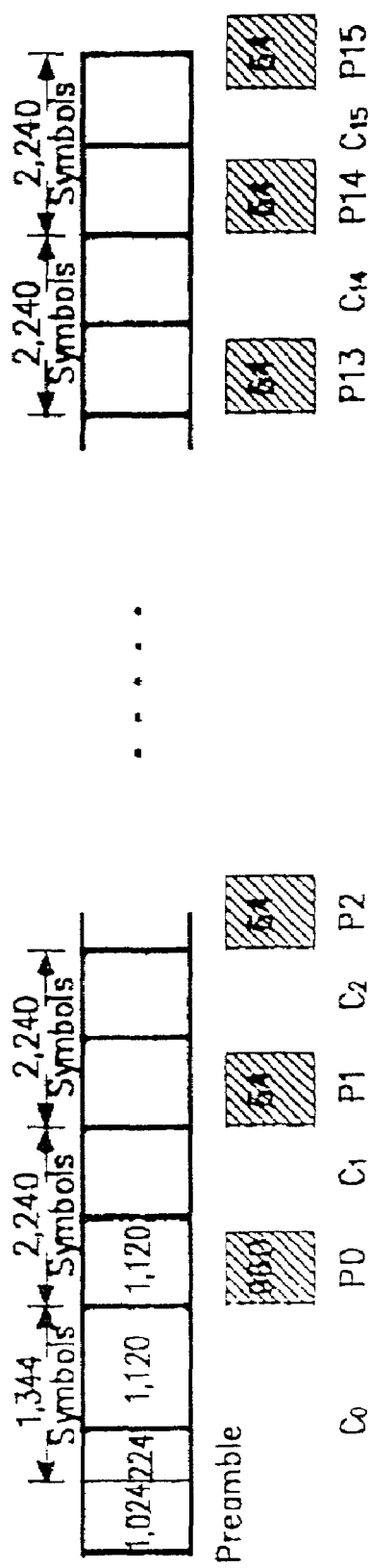
FIG. 14 illustrates a ninth embodiment of the transmission packet structure in a single format according to the present invention.

FIG. 14 illustrates a ninth embodiment of the transmission packet of a single format according to the present invention. A preamble, a pilot, and data are multiplexed in 32 slots for a data rate of 19.2 kbps in the $1^{st}$ row of Table 9.

Figure 15:
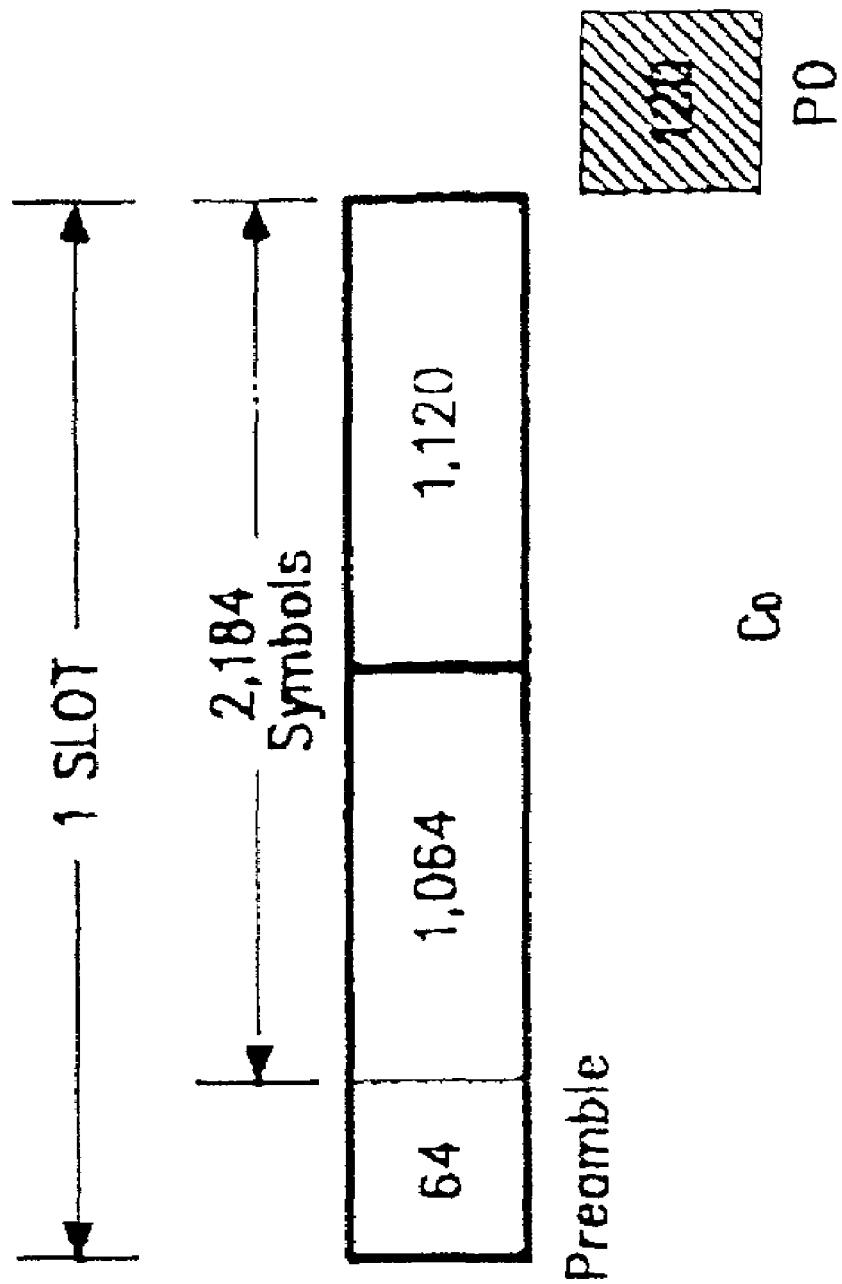
FIG. 15 illustrates an embodiment of a transmission packet structure in a double format according to the present invention.

FIG. 15 illustrates an embodiment of a transmission packet of a double format according to the present invention. A preamble, a pilot, and data are multiplexed in one slots for data rates of 1228.8, 1843.2, and 2457.6 kbps in the $9^{th}$, $11^{th}$, and $13^{th}$ rows of Table 10.

Figure 16:
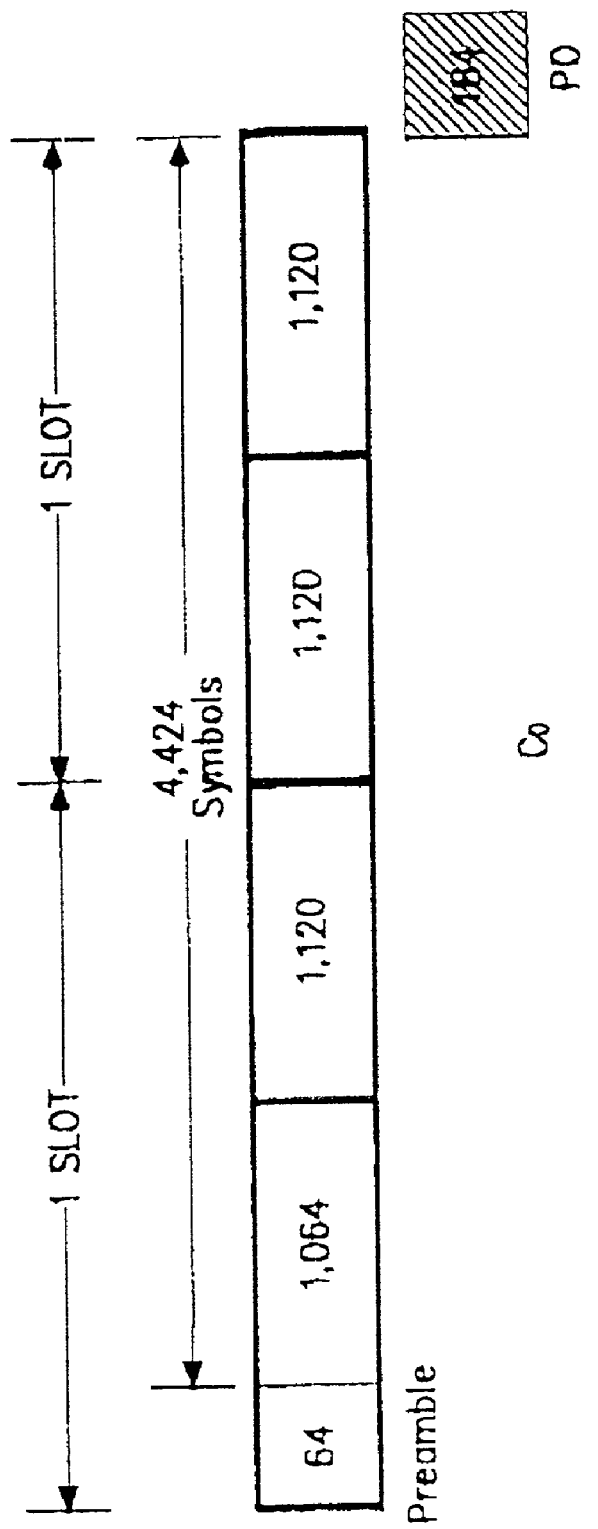
FIG. 16 illustrates another embodiment of the transmission packet structure in a double format according to the present invention.

FIG. 16 illustrates another embodiment of the transmission packet of a double format according to the present invention. A preamble, a pilot, and data are multiplexed in two slots for data rates of 614.4, 921.6, and 1228.8 kbps in the $8^{th}$, $10^{th}$, and $12^{th}$ rows of Table 10.

Figure 17:
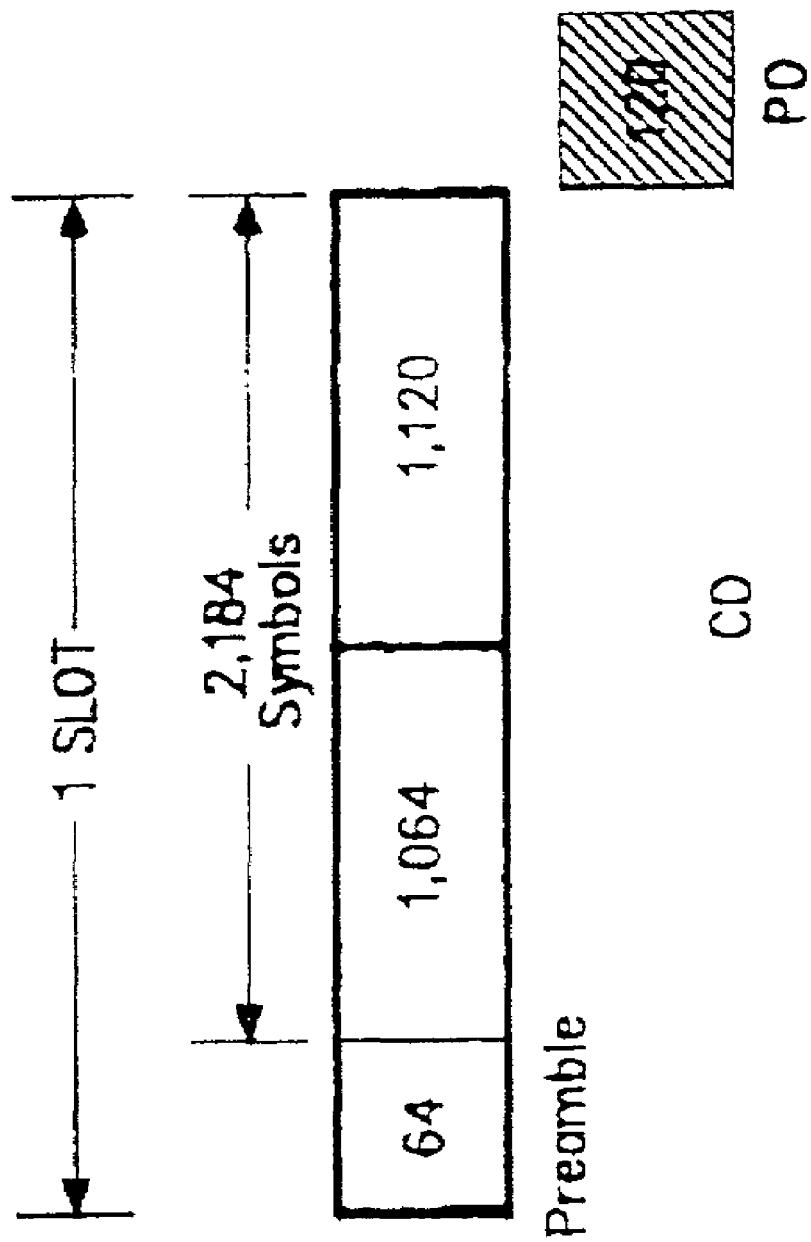
FIG. 17 illustrates a third embodiment of the transmission packet structure in a double format according to the present invention.

FIG. 17 illustrates a third embodiment of the transmission packet of a double format according to the present invention. A preamble, a pilot, and data are multiplexed in one slot for a data rate of 614.4 kbps in the $6^{th}$ row of Table 10.

Figure 18:
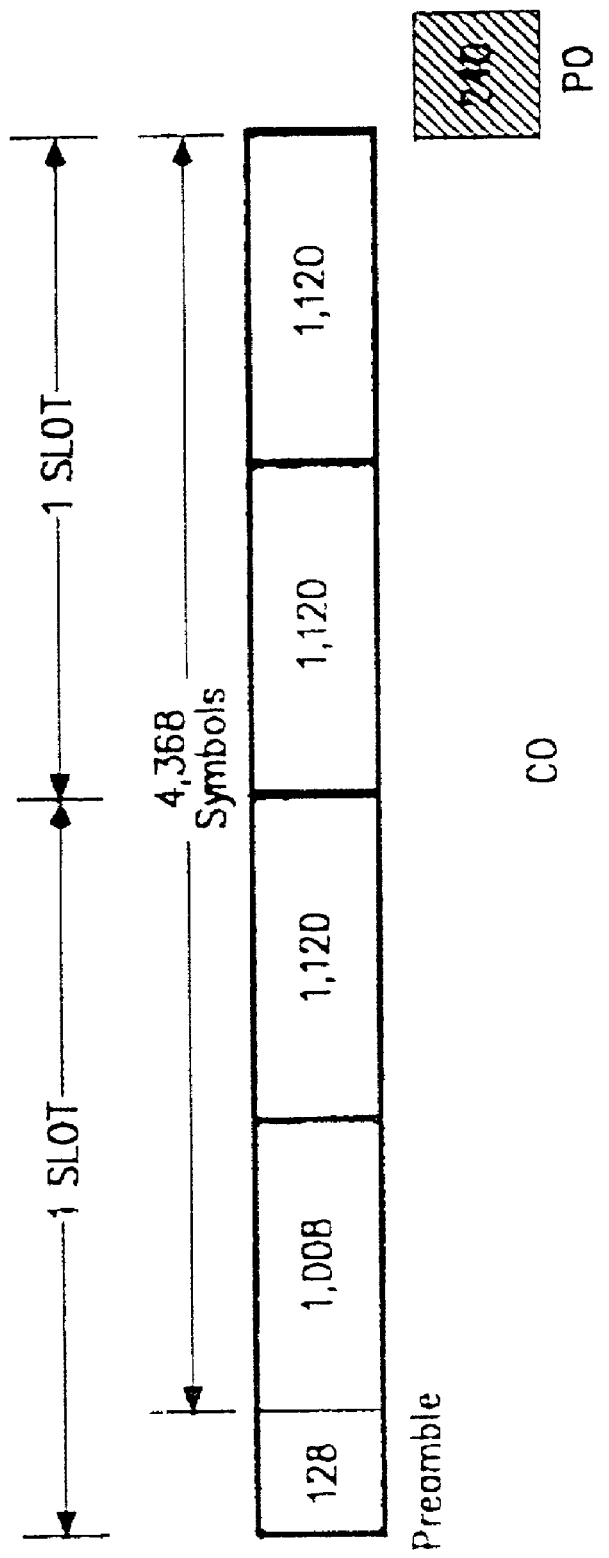
FIG. 18 illustrates a fourth embodiment of the transmission packet structure in a double format according to the present invention.

FIG. 18 illustrates a fourth embodiment of the transmission packet of a double format according to the present invention. A preamble, a pilot, and data are multiplexed in two slots for a data rate of 307.2 kbps in the $5^{th}$ row of Table 10.

Figure 19:
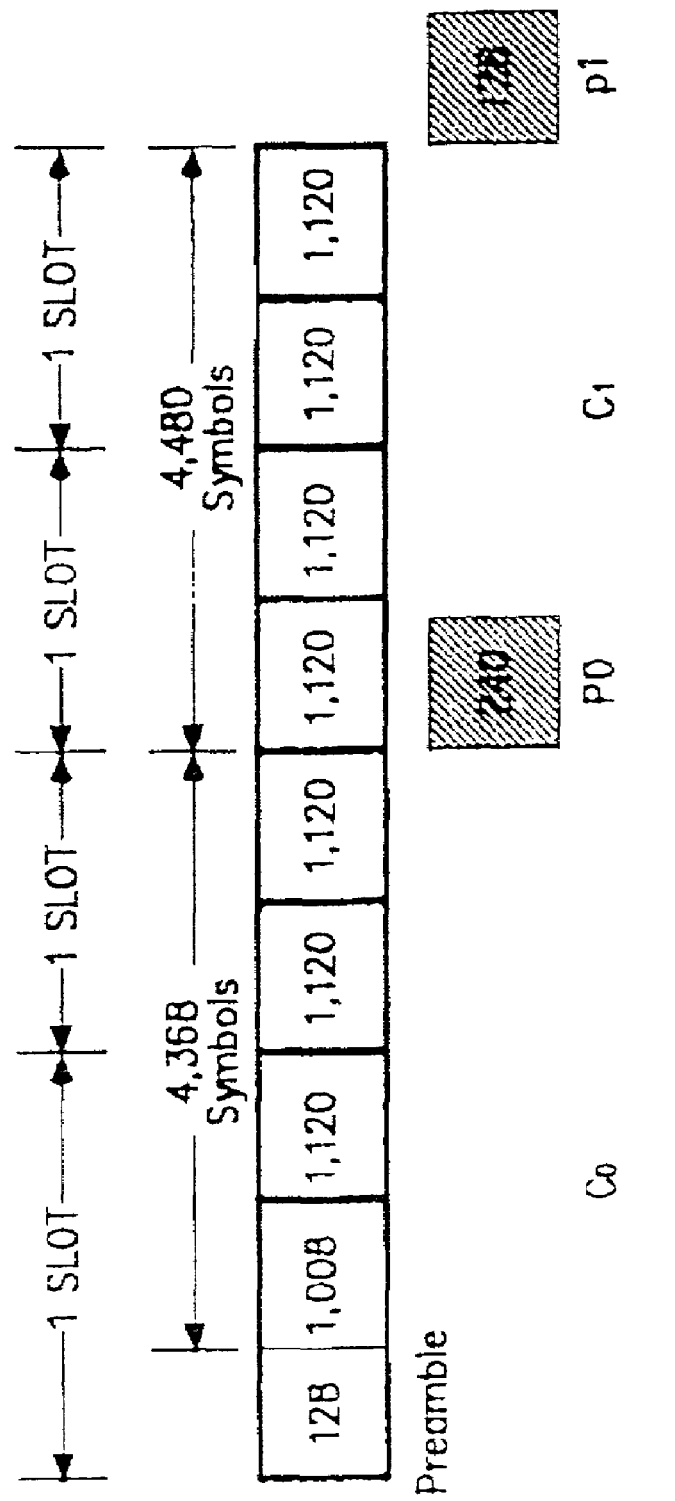
FIG. 19 illustrates a fifth embodiment of the transmission packet structure in a double format according to the present invention.

FIG. 19 illustrates a fifth embodiment of the transmission packet of a double format according to the present invention. A preamble, a pilot, and data are multiplexed in four slots for a data rate of 307.2 kbps in the $7^{th}$ row of Table 10.

Figure 20:
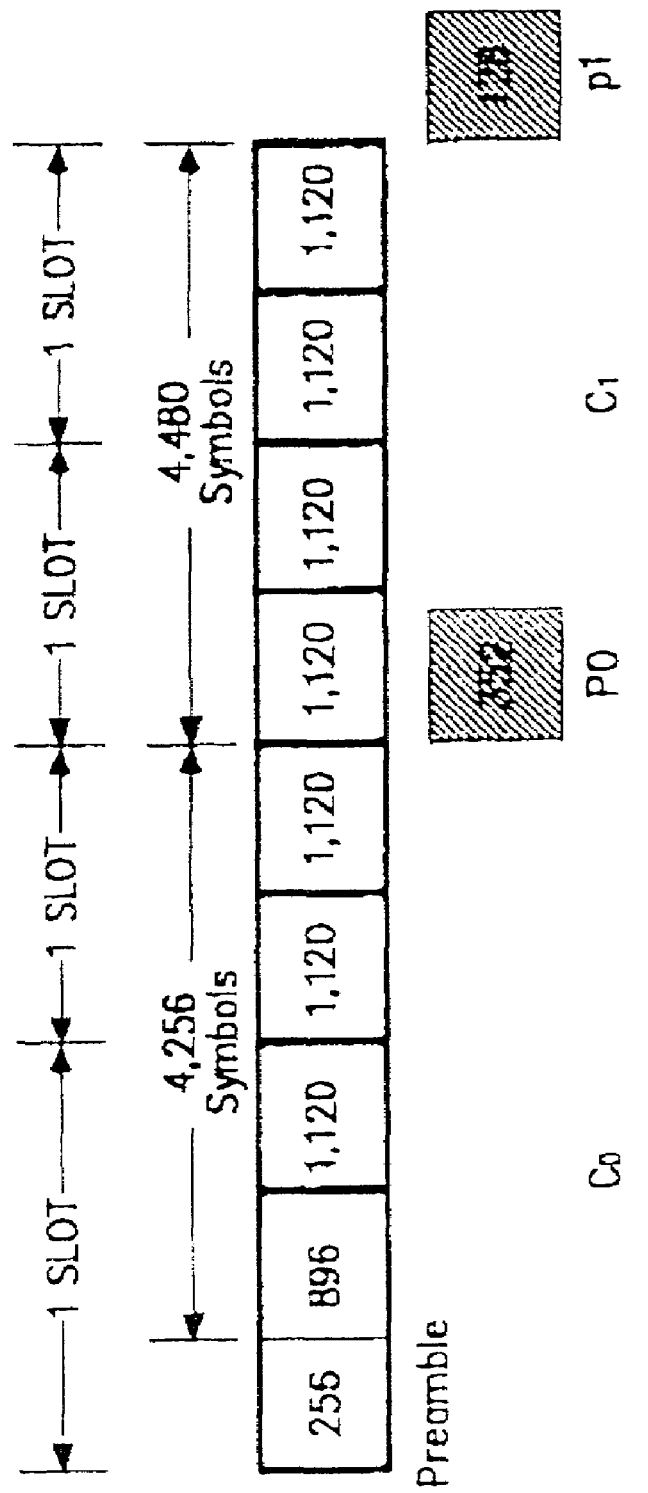
FIG. 20 illustrates a sixth embodiment of the transmission packet structure in a double format according to the present invention.

FIG. 20 illustrates a sixth embodiment of the transmission packet of a double format according to the present invention. A preamble, a pilot, and data are multiplexed in four slots for a data rate of 153.6 kbps in the $4^{th}$ row of Table 10.

Figure 21:
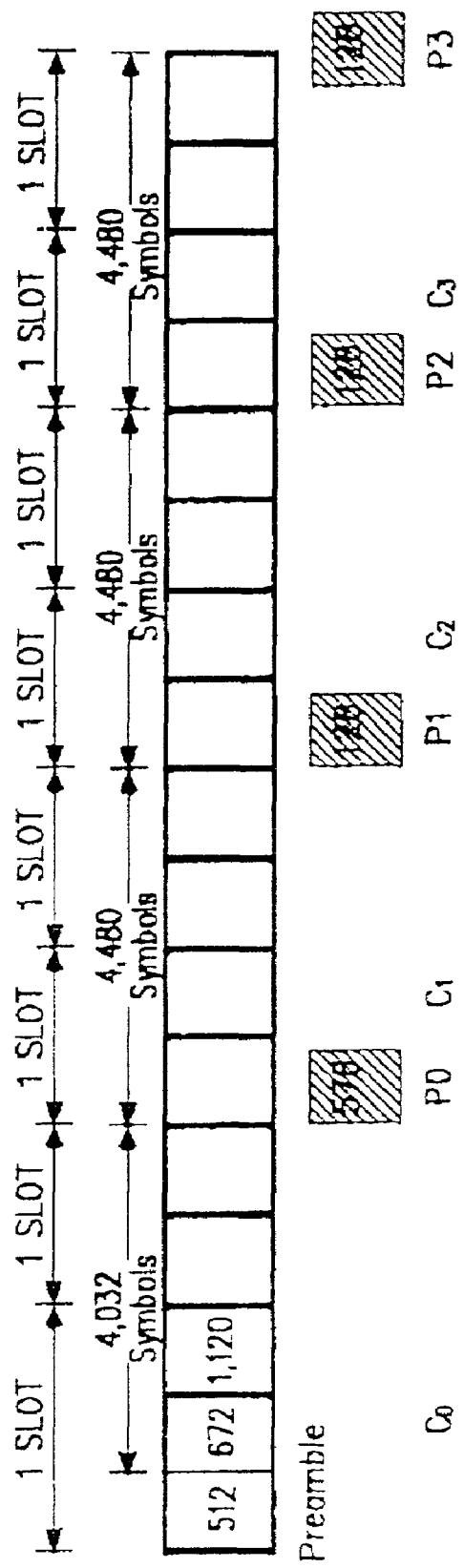
FIG. 21 illustrates a seventh embodiment of the transmission packet structure in a double format according to the present invention.

FIG. 21 illustrates a seventh embodiment of the transmission packet of a double format according to the present invention. A preamble, a pilot, and data are multiplexed in eight slots for a data rate of 76.8 kbps in the $3^{rd}$ row of Table 10.

Figure 22:
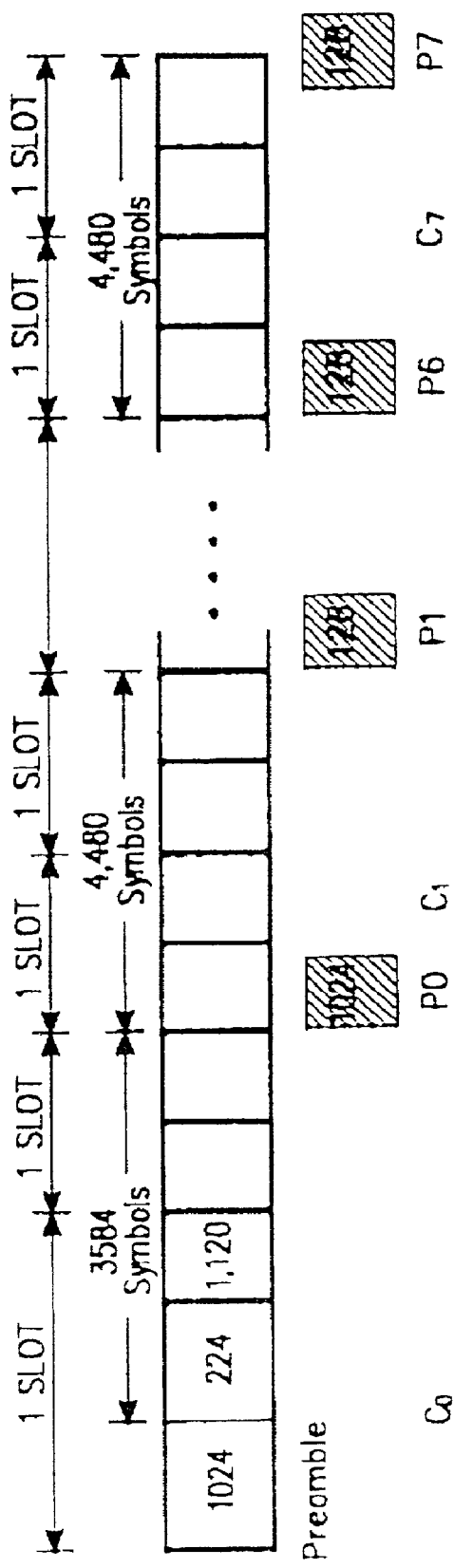
FIG. 22 illustrates an eighth embodiment of the transmission packet structure in a double format according to the present invention.

FIG. 22 illustrates an eighth embodiment of the transmission packet of a double format according to the present invention. A preamble, a pilot, and data are multiplexed in 16 slots for a data rate of 38.4 kbps in the $2^{nd}$ row of Table 10.

Figure 23:
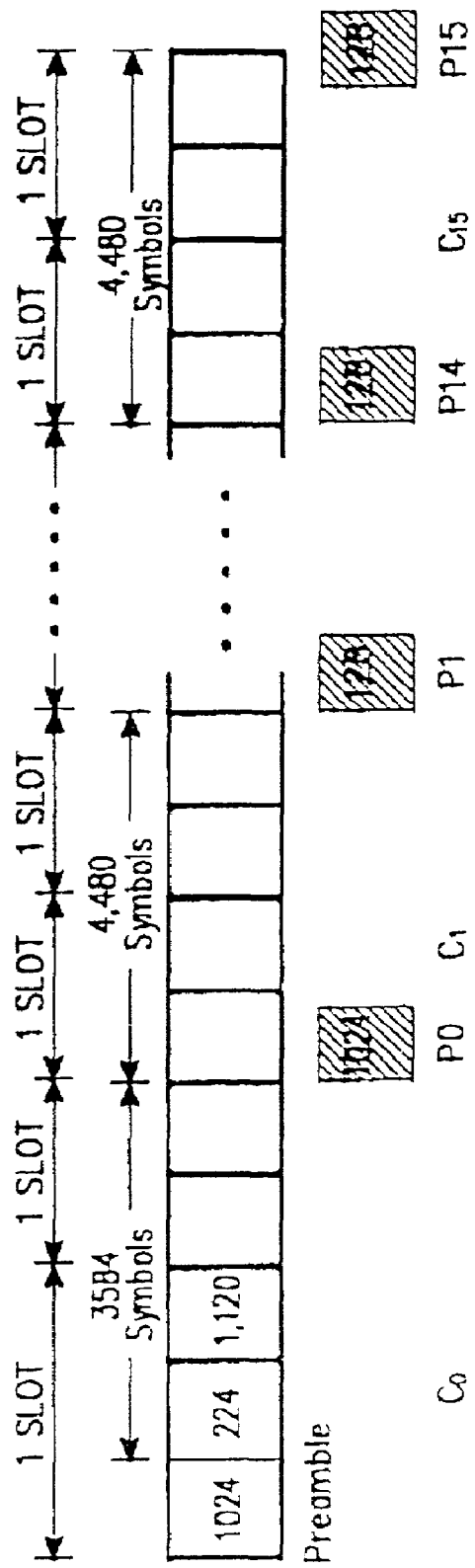
FIG. 23 illustrates a ninth embodiment of the transmission packet structure in a double format according to the present invention.

FIG. 23 illustrates a ninth embodiment of the transmission packet of a double format according to the present invention. A preamble, a pilot, and data are multiplexed in 32 slots for a data rate of 19.2 kbps in the $1^{st}$ row of Table 10.

For a data rate of 2457.6 kbps in Table 9, for example, (64+1056) modulation symbols can be transmitted in one PLP and (1056+92) modulation symbols are generated by modulating a sub-code $C_0$ as shown in FIG. 6. Therefore, 92 modulation symbols are pruned. Here, 64 is the number of preamble symbols and 1056 is (the number of modulation symbols for the sub-code symbols (1056+92)–the number of pruned modulation symbols, 92). As a result, the number of modulation symbols for the sub-code symbols becomes equal to the number of transmittable modulation symbols. For a data rate of 153.6 kbps in Table 9, (256+864+1120)= (1120+1120) modulation symbols can be transmitted in one PLP and (864+1120+288) modulation symbols are generated by modulating a sub-code $C_0$. (1120+1120+288) modulation symbols are generated by modulating a sub-code $C_1$. Therefore, 288 modulation symbols indicated by $P_0$ are pruned from the code symbols generated for the sub-code $C_0$ and 64 modulation symbols indicated by $P_1$ are pruned from the code symbols generated for the sub-code $C_1$.

As seen from the above first example, if the sum of the preamble symbols and the number of channel-interleaved symbols corresponding to the symbols of the first sub-code is greater than the number of transmittable modulation symbols, some of the first sub-code symbols are pruned so that the two numbers are equal.

4. Symbol Pruning

Figure 24:
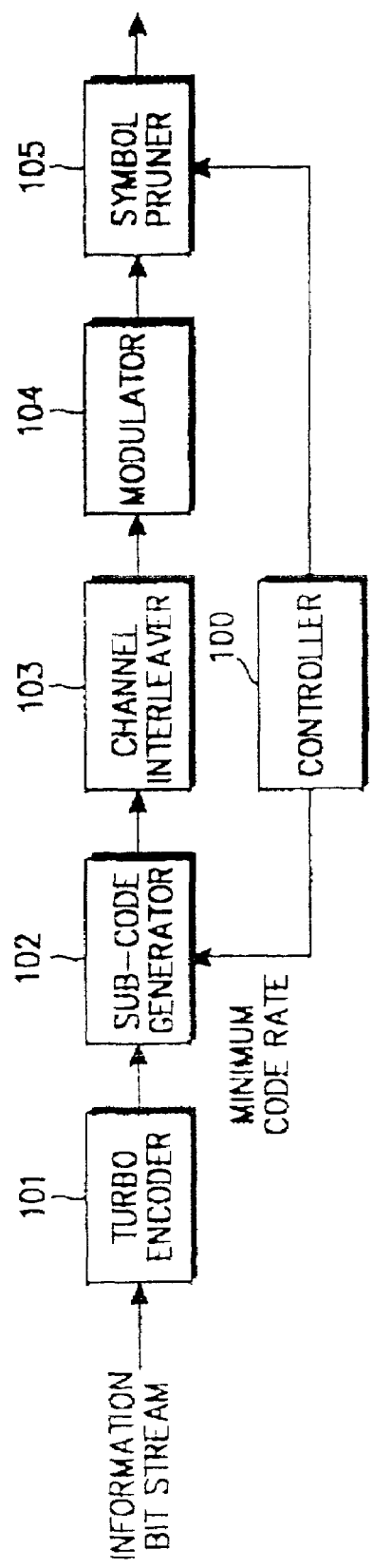
FIG. 24 is a block diagram illustrating an embodiment of a packet data transmitting device according to the present invention.
Figure 25:
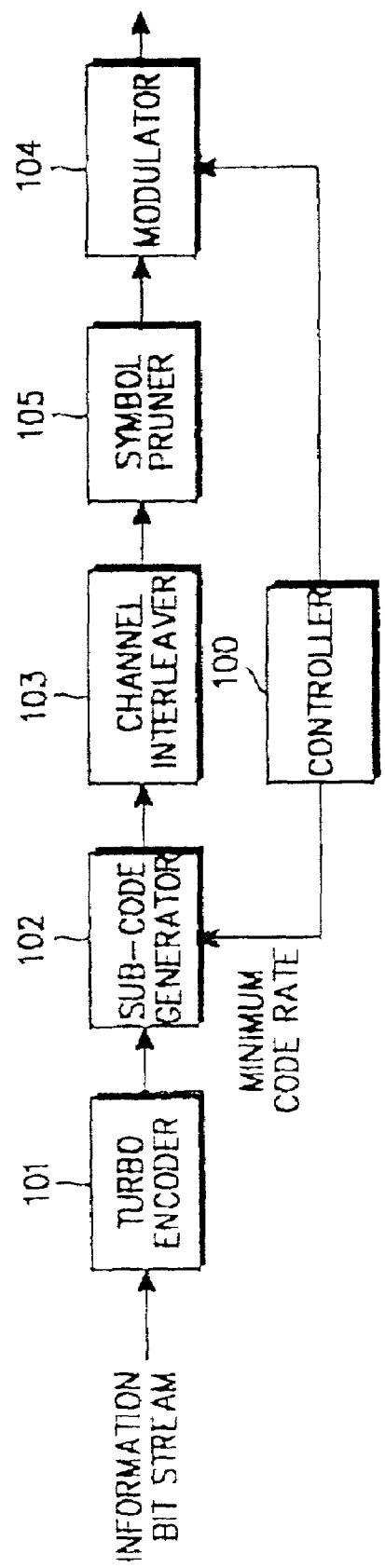
FIG. 25 is a block diagram illustrating another embodiment of the packet data transmitting device according to the present invention.

Symbol pruning is required for Transmission Method (2-2). Embodiments of packet data transmitting devices for such symbol pruning are shown in FIGS. 24 and 25. Each of the packet data transmitting devices is comprised of a controller 100, a turbo encoder 101, a sub-code generator 102, a channel interleaver 103, a modulator 104, and a symbol pruner 105. For the input of a PLP information bit stream, the packet data transmitting device generates a plurality of sub-codes with the same or different code rates and sequentially transmits the sub-codes for time periods when the PLP information stream is assigned.

Referring to FIG. 24, the turbo encoder 101 turbo-encodes the PLP information bit stream with a code rate R=1/5, for example, and outputs code symbols. The sub-code generator 102 selects a sub-code the same as or different from the previously transmitted sub-code upon receipt of a retransmission request from a receiver and generates the code symbols of the selected sub-code. The code selection in the sub-code generator 102 is a kind of redundancy provision. The turbo encoder 101 and the sub-code generator 102 function as a sub-code (quasi-complementary code) generating device as shown in FIG. 2. That is, the turbo encoder 101 and the sub-code generator 102 correspond to the turbo encoder and the sub-code generator 204 of FIG. 2, respectively. The sub-code generator 102 operates based on a minimum code rate determined by the controller 100.

The channel interleaver 103 channel-interleaves the output of the sub-code generator 102. A block interleaver can be used as the channel interleaver 103. The modulator 104 modulates the output of the channel interleaver 103 by a predetermined modulation method such as QPSK (Quadrature Phase Shift Keying)/8-PSK (Phase Shift Keying)/16-QAM (Quadrature Amplitude Modulation). The symbol pruner 105 prunes part of the second half symbols of the output of the modulator 104 under the control of the controller 100.

The controller 100 determines a minimum code rate by which the number of the modulation symbols of a sub-code is equal to or greater than that of transmittable modulation symbols for each time period when a PLP information bit stream is assigned. Symbol pruning for the first time period is performed in the following way. If the sum of the number of preamble symbols and the number of modulation symbols of the first sub-code generated at the minimum code rate is greater than that of transmittable modulation symbols, some of the modulation symbols of the first sub-code are pruned so that the sum of the number of preamble symbols and the number of the modulation symbols of the first sub-code is equal to the number of the transmittable modulation symbols. The operation of the symbol pruner 105 has been described before in connection with the transmission traffic packet structures and transmission methods shown in FIGS. 6 to 23.

In FIG. 24, symbol pruning occurs after modulation in the modulator 104. That is, the modulator 104 is between the channel interleaver 103 and the symbol pruner 105. The modulator 104 sequentially divides a symbol sequence output from the channel interleaver 103 and matches them to modulation symbols. That is, the modulator 104 outputs the modulation symbols in the order of receiving the symbols from the channel interleaver 103. As noted from the description of FIGS. 6 to 23, the symbol pruner 105 virtually prunes part of second half symbols of the output symbols of the channel interleaver 103. Therefore, though the symbol pruner 105 is between the channel interleaver 103 and the modulator 104, symbol pruning is performed in the same manner.

Referring to FIG. 25, the sub-code generator 102 generates a plurality of sub-codes with the same code rate or different code rates for time periods when a PLP information bit stream is assigned. The controller 100 determines a minimum code rate by which the number of the modulation symbols of a sub-code is equal to or greater than that of transmittable modulation symbols for each time period.

The channel interleaver 103 channel-interleaves the symbols of a sub-code generated at the minimum code rate. The symbol pruner 105 prunes part of the second half symbols of the channel-interleaved symbols so that the number of remaining channel-interleaved symbols is equal to the number of transmittable modulation symbols if the number of the channel-interleaved symbols is greater than that of the transmittable modulation symbols. The modulator 104 modulates the remaining channel-interleaved symbols by a predetermined modulation method after pruning.

Symbol pruning in the packet data transmitting devices shown in FIGS. 24 and 25 brings about the following effect in a receiver.

For example, if the channel interleaver size is NC, the number of pruned symbols is PC, and the remaining code symbols is LC (=NC−PC), the receiver considers in channel deinterleaving that the PC code symbols are randomly punctured. The punctured symbols are processed as erasure symbols and then decoding is performed. Since the symbols in the second half of a channel deinterleaver are randomly distributed across the overall code symbols, a decoder determines that LC random errors have been generated, while performance is deteriorated due to the random errors. Considering most systems use random error correction codes, there is no problem with performance. When the errors are processed as erasure symbols, an effective code rate Re is increased by NC/(NC−PC) and the resulting performance is obtained. Therefore, despite pruning part of second half symbols of the channel interleaver, an average performance corresponding to the effective code rate Re is obtained if Re<1. Preferably, a channel interleaver is so configured that the second half symbols of the channel interleaver are distributed across all the code symbols in uniform intervals after channel deinterleaving.

In accordance with the present invention as described above, the length and structure of a transmission packet are determined such that one codeword (one sub-codeword) is transmitted in one physical channel transmission frame. Therefore, the transmission throughput of packet data is increased. Furthermore, the implementation complexity of a receiver is minimized for retransmission of packet data and a transmission protocol for a transmitter is simplified. Also, an ACK/NACK message can be transmitted periodically for code symbols to a transmitter.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of generating a plurality of sub-codes with the same or different code rates for the input of a PLP (Physical Layer Packet) information bit stream and sequentially transmitting symbols with the sub-codes for time periods, comprising the steps of:
   determining a minimum data rate by which the number of the modulation symbols of the sub-code generated by a predetermined modulation method is equal to or greater than the number of transmittable modulation symbols for the time period; and
   pruning part of the modulation symbols of the sub-code so that the number of the modulation symbols of the sub-code is equal to the number of transmittable modulation symbols for the time period, if the number of the modulation symbols of the sub-code is greater than the number of transmittable modulation symbols for the time period.

2. The method of claim 1, wherein symbol pruning is performed on a second half of the modulation symbols of the sub-code.

3. The method of claim 1, wherein the modulation symbols of the sub-code are channel-interleaved symbols.

4. The method of claim 1, wherein symbol pruning for a first time period is performed on symbols of a first sub-code so that the sum of the numbers of preamble symbols and the number of the modulation symbols of the first sub-code is equal to the number of the transmittable modulation symbols, if the sum of the number of preamble symbols and the number of the modulation symbols of the first sub-code is greater than the number of the transmittable modulation symbols.

5. A method of transmitting packet data, comprising the steps of:
   generating a plurality of sub-codes with the same or different code rates for the input of a PLP (Physical Layer Packet) information bit stream;
   determining a minimum data rate by which the number of the modulation symbols of the sub-code generated by a predetermined modulation method is equal to or greater than the number of transmittable modulation symbols for each time period;
   channel-interleaving the symbols of the sub-code generated at the minimum code rate;
   modulating the channel-interleaved symbols by the predetermined modulation method; and
   pruning part of the modulation symbols of the sub-code so that the number of the modulation symbols of the sub-code is equal to the number of transmittable modulation symbols for the time period, if the number of the modulation symbols of the sub-code is greater than the number of transmittable modulation symbols for the time period.

6. The method of claim 5, wherein symbol pruning is performed on a second half of the modulation symbols of the sub-code.

7. The method of claim 5, wherein symbol pruning for a first time period is performed on symbols of a first sub-code so that the sum of the numbers of preamble symbols and the number of the modulation symbols of the first sub-code is equal to the number of the transmittable modulation symbols, if the sum of the number of preamble symbols and the number of the modulation symbols of the first sub-code is greater than the number of transmittable modulation symbols.

8. A method of transmitting packet data, comprising the steps of:
   generating a plurality of sub-codes with the same or different code rates for the input of a PLP (Physical Layer Packet) information bit stream;
   determining a minimum data rate by which the number of the modulation symbols of a sub-code generated by a predetermined modulation method is equal to or greater than the number of transmittable modulation symbols for each time period;
   channel-interleaving the symbols of the sub-code generated at the minimum code rate;
   pruning part of the channel-interleaved symbols so that the number of the channel-interleaved symbols is equal to the number of transmittable modulation symbols, if the number of the channel-interleaved symbols is greater than the number of transmittable modulation symbols; and
   modulating the remaining channel-interleaved symbols by the predetermined modulation method.

9. The method of claim 8, wherein symbol pruning is performed on the second half of the channel-interleaved symbols of the sub-code.

10. The method of claim 8, wherein symbol pruning for a first time period is performed on the channel-interleaved symbols of a first sub-code generated at the minimum code rate so that the sum of the numbers of preamble symbols and the number of the channel-interleaved symbols of the first sub-code is equal to the number of the transmittable modulation symbols, if the sum of the number of preamble symbols and the number of the channel-interleaved symbols of the first sub-code is greater than the number of transmittable modulation symbols.

11. A device for transmitting packet data, comprising:
   a sub-code generator for generating a plurality of sub-codes with the same or different code rates for the input of a PLP (Physical Layer Packet) information bit stream;
   a controller for determining a minimum data rate by which the number of the modulation symbols of a sub-code generated by a predetermined modulation method is equal to or greater than the number of transmittable modulation symbols for each time period; and
   a symbol pruner for pruning part of the modulation symbols of the sub-code so that the number of the modulation symbols of the sub-code is equal to the number of transmittable modulation symbols for the time period, if the number of the modulation symbols of the sub-code is greater than the number of transmittable modulation symbols for the time period.

12. The device of claim 11, wherein the symbol pruner prunes part of the second half of the modulation symbols of the sub-code.

13. The device of claim 11, wherein the symbol pruner prunes part of the symbols of a first sub-code so that the sum of the numbers of preamble symbols and the modulation symbols of the first sub-code are equal to the number of the transmittable modulation symbols in a first time period, if the number of the modulation symbols of the first sub-code is greater than the number of transmittable modulation symbols.

14. A device for transmitting packet data, comprising:
- a sub-code generator for generating a plurality of sub-codes with the same or different code rates for the input of a PLP (Physical Layer Packet) information bit stream and sequentially transmitting the sub-codes for time periods;
- a controller for determining a minimum data rate by which the number of the modulation symbols of a sub-code generated by a predetermined modulation method is equal to or greater than the number of transmittable modulation symbols for a time period;
- a channel interleaver for channel-interleaving the symbols of the sub-code generated at the minimum code rate;
- a modulator for modulating the channel-interleaved symbols by the predetermined modulation method; and
- a symbol pruner for pruning part of the modulation symbols of the sub-code so that the number of the modulation symbols of the sub-code is equal to the number of transmittable modulation symbols for the time period, if the number of the modulation symbols of the sub-code is greater than the number of transmittable modulation symbols for the time period.

15. The device of claim 14, wherein the symbol pruner prunes part of the second half of the modulation symbols of the sub-code.

16. The device of claim 14, wherein the symbol pruner prunes part of the symbols of a first sub-code so that the sum of the numbers of preamble symbols and the number of the modulation symbols of the first sub-code is equal to the number of the transmittable modulation symbols in a first time period, if the sum of the number of preamble symbols and the number of the modulation symbols of the first sub-code is greater than the number of transmittable modulation symbols.

17. A device for transmitting packet data, comprising:
- a sub-code generator for generating a plurality of sub-codes with the same or different code rates for the input of a PLP (Physical Layer Packet) information bit stream and sequentially transmitting the sub-codes for time periods;
- a controller for determining a minimum data rate by which the number of the modulation symbols of a sub-code generated by a predetermined modulation method is equal to or greater than the number of transmittable modulation symbols for a time period;
- a channel interleaver for channel-interleaving the symbols of the sub-code generated at the minimum code rate;
- a symbol pruner for pruning part of the channel-interleaved symbols so that the number of the channel-interleaved symbols is equal to the number of transmittable modulation symbols, if the number of the channel-interleaved symbols is greater than the number of transmittable modulation symbols; and
- a modulator for modulating the remaining channel-interleaved symbols by the predetermined modulation method.

18. The device of claim 17, wherein the symbol pruner prunes part of the second half of the channel-interleaved symbols.

19. The device of claim 17, wherein the symbol pruner prunes part of the channel-interleaved symbols of a first sub-code generated at the minimum code rate so that the sum of the numbers of preamble symbols and the number of the channel-interleaved symbols of the first sub-code is equal to the number of the transmittable modulation symbols in a first time period, if the sum of the number of preamble symbols and the number of the channel-interleaved symbols of the first sub-code is greater than the number of transmittable modulation symbols.

* * * * *